(12) United States Patent
Hirano et al.

(10) Patent No.: US 7,969,892 B2
(45) Date of Patent: Jun. 28, 2011

(54) TUNNELING LOOP DETECTION CONTROL APPARATUS

(75) Inventors: Jun Hirano, Kanagawa (JP); Chan Wah Ng, Singapore (SG); Pek Yew Tan, Singapore (SG); Tien-Ming Benjamin Koh, Singapore (SG); Chun Keong Benjamin Lim, Singapore (SG)

(73) Assignee: Panasonic Corporation, Osaka (JP)

( * ) Notice: Subject to any disclaimer, the term of this patent is extended or adjusted under 35 U.S.C. 154(b) by 380 days.

(21) Appl. No.: 12/090,972

(22) PCT Filed: Oct. 30, 2006

(86) PCT No.: PCT/JP2006/322061
§ 371 (c)(1),
(2), (4) Date: Apr. 21, 2008

(87) PCT Pub. No.: WO2007/049826
PCT Pub. Date: May 3, 2007

(65) Prior Publication Data
US 2009/0238080 A1    Sep. 24, 2009

(51) Int. Cl.
*H04L 12/26* (2006.01)
(52) U.S. Cl. .................................................. 370/241
(58) Field of Classification Search .......... 370/217, 370/325, 392, 241
See application file for complete search history.

(56) References Cited

U.S. PATENT DOCUMENTS

| | | | |
|---|---|---|---|
| 6,765,881 B1 | 7/2004 | Rajakarunana-yake | |
| 7,042,838 B1 * | 5/2006 | Shand et al. | 370/225 |
| 7,477,593 B2 * | 1/2009 | Scudder et al. | 370/217 |
| 7,606,229 B1 * | 10/2009 | Foschiano et al. | 370/392 |
| 2003/0065814 A1 | 4/2003 | Ishii | |
| 2003/0097470 A1 | 5/2003 | Lapuh | |
| 2004/0146007 A1 | 7/2004 | Saadawi | |
| 2005/0063311 A1 | 3/2005 | Sekiguchi | |

OTHER PUBLICATIONS

A. Conta, et al., "Generic Packet Tunneling in IPv6 Specification," RFC2473, Dec. 1998, pp. 1-36.

* cited by examiner

*Primary Examiner* — Derrick W Ferris
*Assistant Examiner* — Gbemileke Onamuti
(74) *Attorney, Agent, or Firm* — Dickinson Wright PLLC

(57) ABSTRACT

Disclosed is a technique whereby a tunnel entry point, which encapsulates a packet (generates a tunnel packet), can detect the presence of a tunneling loop causing a packet to loop the same path while encapsulated. According to this technique, upon receipt of a packet from a source node (source) 1100, TEP (tunnel entry point) 1120 inserts it into a tunnel packet header for encapsulation. Upon receipt of tunnel packets from TEP 1120 and TEP 1140, each of TEP 1140 and TEP 1160 copies the identifier of the original tunnel packet header to a new tunnel packet header for encapsulation. When this tunnel packet returns to TEP 1120 due to a tunneling loop, the tunneling loop is detected by referring to the identifier in the received tunnel packet.

7 Claims, 15 Drawing Sheets

TUNNELING LOOP DETECTION CONTROL APPARATUS

TECHNICAL FIELD

The present invention relates to a tunneling loop detection control apparatus for controlling packet encapsulation (packet tunneling) in packet-switched data communication networks.

BACKGROUND ART

A large number of protocols pertaining to the Internet Protocol suite have employed packet encapsulation (alternatively, packet tunneling). In IPv6 (Internet Protocol version 6), this packet encapsulation is principally defined in the following Non-Patent Document 1.

For example, Virtual Private Network (VPN) uses a tunneling technique to interconnect two or more networks existing at different locations for the formation of a large-scale private network.

In addition, Mobility Support in Mobile IPv6 (MIPv6) uses tunneling between mobile nodes and home agents to allow a mobile node to be always reachable at its home address.

Still additionally, Network Mobility Support (NEMO) in IPv6 specifies that a mobile router should establish tunnel with its home agent to allow a whole network to roam the Internet while still reachable at the mobile network prefix.

IPv6 tunneling is the encapsulation of an inner IPv6 packet as the payload of an outer IPv6 packet. The inner packet is sometimes referred to as payload packet, while the outer packet is sometimes referred to as tunnel packet.

The tunneling involves two entities: a tunnel entry node and a tunnel exit node. In this specification, the tunnel entry node is sometimes expressed as a tunnel entry point or TEP while the tunnel exit node is sometimes expressed as a tunnel exit point.

The tunnel entry node encapsulates a payload packet into or with a tunnel packet having an address of the tunnel entry node as a source address and having an address of the tunnel exit node as a destination address. When the tunnel packet reaches the tunnel exit node, the payload packet is decapsulated, and routed in a normal manner. This effectively creates an overlay network over the existing routing infrastructure.

Moreover, the payload packet may be encrypted so that intermediate routers cannot see the contents of the inner packet. Since the tunneling hides the source and destination addresses of the inner packet, the existing routing infrastructure can only make a routing decision on the basis of the outer packet.

However, this may lead to a phenomenon known as a tunneling loop when a tunnel packet is routed back to the tunnel entry node before reaching the tunnel exit node.

Still moreover, the tunneling loop is more likely to occur if a packet needs to undergo several levels of encapsulation. Since the encapsulation conceals the source address of the inner packet, a tunnel entry node may not recognize that it has already tunneled this packet previously. The tunneling loop is not desirable because it quickly eats up network resources.

A packet in a tunneling loop (along a tunneling loop) gets routed infinitely because a new Hop Limit field is set in each encapsulated packet. In consequence, for safeguarding against routing loop, the existing mechanism using hop limit becomes ineffective.

Yet moreover, each encapsulation adds an extra packet header to the packet, which enlarges the packet size. The extreme enlargement of the packet size may cause fragmentation. To this end, a different packet (divided packet) is introduced into the tunneling loop.

There are many possible cases in which a tunneling loop might occur. FIGS. 1A and 1B show two possible scenarios.

In FIG. 1A, MR (Mobile Router) 110, MR 112 and MR 114 are roaming in the Internet 100. There is a possibility that each of these mobile routers forms a tunneling loop.

In this case, MR 110 is connected to MR 112 as shown by the connection 120, MR 112 is connected to MR 114 as shown by the connection 122, and MR 114 is connected to MR 110 as shown by the connection 124. Whenever one (for example, MR 110) of the mobile routers makes the tunneling to its HA (Home Agent) 140, MR 110 encapsulates the packet for the tunneling to HA 140 and hands over the packet to MR 112 forming an access router of MR 110.

MR 112 further encapsulates the packet to hand over the packet to its own home agent. The packet is passed to MR 114 for the encapsulation of the packet. This goes on forever, and each of the mobile routers continuously adds one layer of encapsulation to the packet.

FIG. 1B shows a scenario in which MN (Mobile Node) 130 has two home addresses (MN. HoA1 and MN. HoA2) and home agents (HA 140 and HA 142) respectively corresponding thereto exist.

HA 140 manages the home address MN. HoA1, while HA 142 manages the home address MN. HoA2. Let it be assumed that MN 130 accidentally or intentionally has notified to HA 140 that its own care-of address (CoA) is MN. HoA2 and has notified to HA 142 that its own care-of address (CoA) is MN. HoA1.

The outcome is that, in a binding cache 150 of HA 140, there is stored an entry having a home address (HoA) field 162 including MN. HoA1 and a care-of address (CoA) field 164 including MN. HoA2. Likewise, in a binding cache 152 of HA 142, there is stored an entry having a home address field 166 including MN. HoA2 and a care-of address field 168 including MN. HoA1.

Now, in a case in which one (for example, HA 140) of the home agents receives a packet addressed to MN 130, HA 140 encapsulates the packet so that the packet is transferred to the care-of address (i.e., MN. HoA2) specified in its own binding cache. This is shown as a path 172 in FIG. 1B.

HA 142 receives (intercepts) this packet and tunnels the packet to the care-of address (MN. HoA1) of MN 130 in its own binding cache 152. This causes the packet to be returned through the tunnel to HA 140 as shown as the path 174 in FIG. 1B. Moreover, this loop will go on indefinitely.

The following Non-Patent Document 1 discloses the prevention of catastrophic consequences of a tunneling loop by use of a Tunnel Encapsulation Limit (TEL) option. This TEL option is a destination header option containing the maximum number of encapsulations a packet can undergo.

Normally, an intermediate routing node would not inspect the destination header of a transit packet. However, the Non-Patent Document 1 requires that all tunnel entry nodes inspect the destination header of a packet before encapsulation. In addition, if a TEL option is found in the packet, the tunnel entry node must first check that the maximum number of encapsulations allowed in the TEL option is not zero.

In a case in which the value specified in the TEL option is zero, the tunnel entry node discards the packet and transmits to the packet originator an Internet Control Message Protocol (ICMP) error for notifying a problem to the originator.

Moreover, if the TEL option is not zero, the tunnel entry node conducts the packet encapsulation processing to add a TEL option, containing a value obtained by subtracting one from the original TEL option (TEL option at the reception of the packet), to a new tunnel packet header.

On the other hand, in a case in which the original packet (received packet) does not contain a TEL option, the tunnel entry node carries out the encapsulation processing and adds to the tunnel packet header a TEL option containing a default numeric value of the maximum encapsulation. This default numeric value is a parameter set by the tunnel entry node.

Furthermore, FIG. 1C shows an example of an operation of a technique disclosed in the aforesaid Non-Patent Document 1. Here, a source node 180 (expressed as source in FIG. 1C) is a data transmitting node which transmits data packets to an arbitrary destination. The packets go through a path by way of three tunnel entry points (TEP 182, TEP 184, TEP 186). Let it be assumed that the three tunnel entry points, however, form a tunneling loop due to mis-configuration or for other reasons.

When the source node 180 transmits a data packet 187 (expressed as Data in FIG. 1C), the data packet 187 reaches the first tunnel entry (TEP 182). TEP 182 encapsulates the data packet into a tunnel packet 188 and adds a TEL option to the tunnel packet header. Since the payload packet 187 does not contain any TEL option, the TEL option in the tunnel packet 188 has a limit field in which set is a default value (for example, "4").

Moreover, TEP 184 tunnels this packet (in FIG. 1C, expressed as Pkt {TEL=3}) to TEP 186, thereby generating a packet 189 with a TEL limit of "3" (in FIG. 1C, expressed as Pkt {TEL=3}). TEP 186 further tunnels this packet to TEP 182, thereby generating a packet 190 with a TEL limit of "2" (in FIG. 1C, expressed as Pkt {TEL=2}). TEP 184 still further tunnels this packet to TEP 184, thereby generating a packet 191 with a TEL limit of "1" (in FIG. 1C, expressed as Pkt {TEL=1}). Finally, TEP 184 tunnels this packet to TEP 186, which produces a packet 192 with a TEL limit of "0" (in FIG. 1C, expressed as Pkt {TEL=0}).

At this time, TEP 186 notices that the received packet has a TEL option with a value of zero. So further implementation of encapsulation becomes impossible. TEP 186 then discards the packet 192 and sends back to the source (i.e., TEP 184) of the packet 192 an ICMP error message 193 (in FIG. 1C, expressed as ICMP-Error) indicative of the original TEL option of the packet 192.

Upon receipt of this ICMP error message 193, TEP 184 extracts the original packet 191 from the ICMP error message 193 and sends back to the source of the packet 191 (i.e., TEP 182) an ICMP error message 194 (in FIG. 1C, expressed as ICMP-Error) indicative of the TEL option of the packet 191. This return of the ICMP error message is carried out until the packet extracted from the received ICMP error message contains no TEL option (that is, the ICMP error messages 195 to 197 (in FIG. 1C, expressed as ICMP-Error) are returned sequentially). In this connection, in FIG. 1C, when TEP 182 receives the ICMP error message 197, the packet contains no TEL option. Following this, a final ICMP error message 198 (in FIG. 1C, expressed as ICMP-Error) is sent from TEP 182 to the original source node 180.

In addition, there exists another conventional technique which tries to solve the problems related to the routing loop. For example, the following Patent Document 1 discloses a method of making an estimation as to whether or not a routing loop has occurred for detecting a common routing loop by using a counter for counting the number of packets for a predetermined period of time for each hop number included in their IP headers.

Still additionally, there is a different conventional technique which tries to prevent a routing loop itself. For example, the following Patent Document 2 discloses a mobile ad-hoc routing method which tries to prevent a routing loop. Yet additionally, the following Patent Document 3 discloses a routing method of using a spanning tree algorithm (global tree algorithm) for preventing the occurrence of a routing loop with respect to layer 2 tunneling protocol (L2TP) and virtual private network (VPN).

Non-Patent Document 1: "Generic Packet Tunneling in IPv6 Specification", RFC2473, December 1998
Patent Document 1: US Patent Application Publication
Patent Document 2: US Patent Application Publication 2004/0146007
Patent Document 3: U.S. Pat. No. 6,765,881

However, although the technique disclosed in the Non-Patent Document 1 can prevent tunnel loop to continuously develop infinitely by the employment of the above-mentioned TEL options, it is an insufficient solving method with respect to complicated problems. In particular, in the case of the employment of the TEL options, a receiver, who receives ICMP error messages, cannot make a decision as to whether the reason that the TEL value is zero is because of a tunneling loop or because of the mere insufficient setting of TEL with respect to the number of tunnels through which the packet is required to pass until reaching a final destination.

Therefore, it is unclear how the tunnel entry node handles ICMP error notifying the arrival at the limit of tunnel encapsulation.

The tunnel entry node can increase the default TEL value to try the passing of packets. However, in a case in which a tunneling loop actually exists, the reception of ICMP error and the increase of the default TEL value may endlessly take place.

Moreover, the tunnel entry node can merely reject a tunnel packet having the same destination address on the assumption that a tunnel loop exists. However, if the real reason for the occurrence of an ICMP error is that the number of tunnels through which the packet is required to pass is larger than the TEL value set in order for the packet to reach the final destination, unnecessary service rejection can take place.

From the above explanation, it is seen that the problem related to the use of the TEL option arises because the TEL option does not include information whereby the tunnel entry node can distinguish between a case of the formation of a tunnel loop and a case of the number of tunnels through which the packet is required to pass being larger than the set default TEL value.

In addition, the method disclosed in Patent Document 1 is not suitable for a router made to handle thousands of packets per second. Still additionally, it is more like a heuristic method of estimating an indication of a routing loop than an actual loop detection algorithm.

The methods disclosed in Patent Documents 2 and 3 create a problem in that the calculation cost for deliberately preventing loop may not be justifiable, particularly when the probability of the loop occurrence is considerably low. The tunneling protocol makes use of the underlying routing infrastructure with respect to the packet routing from the tunnel entry node to the tunnel exit node. Therefore, the above-mentioned problem applies particularly to the tunneling protocol. Moreover, as long as the underlying routing infrastructure does not have any routing loop, the actual possibilities of the occurrence of a tunneling loop are considerably low. For this reason, a complete and complicated loop avoidance mechanism is not suitable for tunneling protocols.

DISCLOSURE OF THE INVENTION

In consideration of the above-mentioned problems, it is an object of the present invention to provide a tunneling loop detection control apparatus which allows a tunnel entry point to detect the presence of a tunneling loop.

For achieving the above-mentioned purpose, a tunneling loop detection control apparatus according to the present invention is so arranged that a tunneling loop detection identifier is added to a packet, which is to be transferred, for allowing a detection as to whether or not there is a tunneling loop with respect to a packet.

The aforesaid arrangement enables a tunnel entry point, which makes a packet encapsulation (generates a tunnel packet), to detect the presence of a tunneling loop in which a packet loops along the same path while undergoing the encapsulation.

For achieving the above-mentioned purpose, a tunneling loop detection control apparatus according to the present invention comprises:

packet receiving means for receiving a packet;

packet encapsulating means for encapsulating the packet received by the packet receiving means to generate a tunnel packet;

identifier inserting means for, when the tunnel packet is generated by the packet encapsulating means, inserting the tunneling loop detection identifier, added, into a header of the tunnel packet; and tunnel packet transmitting means for transmitting the tunnel packet generated by the packet encapsulating means.

This configuration enables a tunnel entry point, which makes a packet encapsulation, to detect the presence of a tunneling loop by adding a tunneling loop detection identifier to the header of a tunnel packet generated by the packet encapsulation.

Combined with the above-mentioned configuration, the tunneling loop detection control apparatus according to the present invention is so arranged that unique information allocated to each communication equipment including the tunneling loop detection control apparatus is used as the tunneling loop detection identifier.

The aforesaid configuration enables identifying the first tunneling entry point through the use of the tunneling loop detection identifier.

In addition, combined with the above-mentioned configuration, the tunneling loop detection control apparatus according to the present invention is so arranged that address information allocated to each communication equipment including the tunneling loop detection control apparatus, or a result of operation of a hash function relative to the address information, is used as the tunneling loop detection identifier.

The above-mentioned configuration enables assuring the uniqueness of the tunneling loop detection identifier completely or with considerably high accuracy.

Still additionally, combined with the above-mentioned configuration, the tunneling loop detection control apparatus according to the present invention comprises:

identifier presence confirming means for confirming whether or not the tunneling loop detection identifier is present in a header of the packet received by the packet receiving means;

identifier insertion control means for, when the presence of the tunneling loop detection identifier is not confirmed by the identifier presence confirming means, controlling the identifier inserting means so that the unique information is inserted as the tunneling loop detection identifier;

identifier comparing means for, when the presence of the tunneling loop detection identifier is confirmed by the identifier presence confirming means, confirming whether or not the tunneling loop detection identifier in the header of the packet received by the packet receiving means is identical to the unique information;

error processing starting means for, when a result of the comparison in the identifier comparing means shows that the tunneling loop detection identifier in the header of the packet received by the packet receiving means is identical to the unique information, starting detection error processing on a tunneling loop; and identifier duplication control means for, when a result of the comparison in the identifier comparing means shows that the tunneling loop detection identifier in the header of the packet received by the packet receiving means is not identical to the unique information, controlling the identifier inserting means so that the tunneling loop identifier included in the header of the packet received by the packet receiving means is inserted as the tunneling loop detection identifier into the header of the tunnel packet.

The above-mentioned configuration enables the tunneling loop detection identifier to be propagated in a state inserted into the header of the tunnel packet and further a tunnel loop to be detected when this tunneling loop detection identifier agrees with unique information specifying itself.

Yet additionally, combined with the above-mentioned configuration, the tunneling loop detection control apparatus according to the present invention comprises:

error message identifier comparing means for, when the packet received by the packet receiving means is an error message indicative of the fact that an upper limit of tunnel encapsulation has been exceeded, making a comparison as to whether or not a value of the tunneling loop detection identifier included in a header of a packet existing in a payload section of the error message agrees with a tunneling loop detection identifier stored in predetermined information storing means;

error processing starting means for, when a result of the comparison in the error message identifier comparing means shows that the value of the tunneling loop detection identifier included in the header of the packet existing in the payload section of the error message is identical to the tunneling loop detection identifier stored in the predetermined information storing means, starting detection error processing on a tunneling loop;

error message processing control means for, when a result of the comparison in the error message identifier comparing means shows that the value of the tunneling loop detection identifier included in the header of the packet existing in the payload section of the error message is not identical to the tunneling loop detection identifier stored in the predetermined information storing means, executing control so as to generate an error message including a packet corresponding to a packet existing in the payload section of the error message and included in a payload section of a packet existing in the payload section of the error message and further to store the tunneling loop identifier included in the header of the packet existing in the payload section of the error message in the predetermined information storing means; and error message returning means for returning, to a destination of error notification, the error message generated by the error message generating means.

The above-mentioned configuration enables a detection of a tunneling loop at the return of an error message (in particular, an ICMP error message returnable in a state where a received packet is directly inserted into a payload).

Moreover, combined with the above-mentioned configuration, the tunneling loop detection control apparatus according to the present invention comprises:

identifier presence confirming means for confirming whether or not the tunneling loop, detection identifier is present in a header of the packet received by the packet receiving means;

identifier insertion control means for, when the presence of the tunneling loop detection identifier is not confirmed by the identifier presence confirming means, controlling the identifier inserting means so that the unique information is inserted as the tunneling loop detection identifier;

identifier comparing means for, when the presence of the tunneling loop detection identifier is confirmed by the identifier presence confirming means, confirming whether or not one of a plurality of information constituting the tunneling loop detection identifier in the header of the packet received by the packet receiving means is identical to the unique information;

error processing starting means for, when a result of the comparison in the identifier comparing means shows that one of the plurality of information constituting the tunneling loop detection identifier in the header of the packet received by the packet receiving means is identical to the unique information, starting detection error processing on a tunneling loop; and identifier insertion control means for, when a result of the comparison in the identifier comparing means shows that all the plurality of information constituting the tunneling loop detection identifier in the header of the packet received by the packet receiving means do not agree with the unique information, controlling the identifier inserting means so that a tunneling loop detection identifier is organized with the tunneling loop identifier included in the header of the packet received by the packet receiving means and the unique information so as to insert the newly organized tunneling loop detection identifier as the tunneling loop detection identifier into the header of the tunnel packet.

With the above-mentioned configuration, since at the transfer of a packet the identifiers of all the tunnel entry points which have encapsulated this packet are added to the header of the packet, by referring to the header of the packet, the tunnel entry point can make a decision as to whether or not this packet is a packet on which it carried out the encapsulation processing in former times, thereby enabling a detection of a tunneling loop.

Still moreover, combined with the above-mentioned configuration, the tunneling loop detection control apparatus according to the present invention uses, as the tunneling loop detection identifier, different information for each of the tunnel packets generated by the packet encapsulating means.

With the above-mentioned configuration, each tunnel packet becomes identifiable through the use of the tunneling loop detection identifier.

Yet moreover, combined with the above-mentioned configuration, the tunneling loop detection control apparatus according to the present invention comprises numeric value generating means for generating a numeric value to be used as the different information for each of the tunnel packets at random or according to a predetermined sequence.

The above-mentioned configuration enables a random number or sequence number to be used as the tunneling loop detection identifier which makes each tunnel packet identifiable.

In addition, combined with the above-mentioned configuration, the tunneling loop detection control apparatus according to the present invention comprises:

identifier presence confirming means for confirming whether or not the tunneling loop detection identifier is present in a header of the packet received by the packet receiving means;

identifier insertion control means for, when the presence of the tunneling loop detection identifier is not confirmed by the identifier presence confirming means, controlling the identifier inserting means so that different information for each of the tunnel packets is inserted as the tunneling loop detection identifier;

identifier comparing means for, when the presence of the tunneling loop detection identifier is confirmed by the identifier presence confirming means, confirming whether or not the tunneling loop detection identifier in the header of the packet received by the packet receiving means agrees with a tunneling loop detection identifier stored in the predetermined information storing means;

error processing starting means for, when a result of the comparison in the identifier comparing means shows that the tunneling loop detection identifier in the header of the packet received by the packet receiving means agrees with the tunneling loop detection identifier stored in the predetermined information storing means, starting detection error processing on a tunneling loop; and identifier duplication control means for, when a result of the comparison in the identifier comparing means shows that the tunneling loop detection identifier in the header of the packet received by the packet receiving means do not agree with the tunneling loop detection identifier stored in the predetermined information storing means, controlling the identifier inserting means so that the tunneling loop identifier included in the header of the packet received by the packet receiving means is inserted as the tunneling loop detection identifier into the header of the tunnel packet and the tunneling loop identifier included in the header of the packet received by the packet receiving means is stored in the predetermined information storing means.

The above-mentioned configuration enables the tunneling loop detection identifier to be propagated in a state inserted into the header of the tunnel packet and further enables each tunnel entry point to detect a tunneling loop in a case in which the tunneling loop detection identifier in the received packet agrees with the tunneling loop detection identifier stored.

Still additionally, combined with the above-mentioned configuration, the tunneling loop detection control apparatus according to the present invention comprises memory control means for executing control so that, when a predetermined period of time elapses from the storage, the tunneling loop detection identifier stored in the predetermined information storage means is released from the predetermined information storage means.

The above-mentioned configuration enables saving a resource for a memory to be used for storing a tunneling loop detection identifier.

Yet additionally, combined with the above-mentioned configuration, the tunneling loop detection control apparatus according to the present invention uses, as the tunneling loop detection identifier, information obtained by a combination of a static portion including unique information allocated to each communication equipment including the tunneling loop detection control apparatus and a dynamic portion including different information for each of the tunnel packets generated by the packet encapsulating means.

The above-mentioned configuration enables the first tunnel entry point to become identifiable by the tunneling loop detection identifier and each tunnel packet to become identifiable.

Moreover, combined with the above-mentioned configuration, the tunneling loop detection control apparatus according to the present invention uses, as the static portion, address information allocated to each communication equipment including the tunneling loop detection control apparatus or a result of operation of a hash function relative to the address information.

The above-mentioned configuration enables assuring the uniqueness of the static portion of the tunneling loop detection identifier completely or with considerably high accuracy.

Still moreover, combined with the above-mentioned configuration, the tunneling loop detection control apparatus according to the present invention comprises numeric value generating means for generating a numeric value to be used as the different information for each of the tunnel packets at random or according to a predetermined sequence.

The above-mentioned configuration enables a random number or sequence number to be used as the dynamic portion of the tunneling loop detection identifier which makes each tunnel packet identifiable.

Yet moreover, combined with the above-mentioned configuration, the tunneling loop detection control apparatus according to the present invention comprises:

identifier presence confirming means for confirming whether or not the tunneling loop detection identifier is present in a header of the packet received by the packet receiving means;

identifier insertion control means for, when the presence of the tunneling loop detection identifier is not confirmed by the identifier presence confirming means, controlling the identifier inserting means so that information obtained by a combination of the unique information and different information for each of the tunnel packets is inserted as the tunneling loop detection identifier;

static identifier comparing means for, when the presence of the tunneling loop detection identifier is confirmed by the identifier presence confirming means, confirming whether or not a static portion of the tunneling loop detection identifier in the header of the packet received by the packet receiving means agrees with the unique information;

identifier comparing means for, when the presence of the tunneling loop detection identifier is confirmed by the identifier presence confirming means, confirming whether or not the tunneling loop detection identifier in the header of the packet received by the packet receiving means agrees with a tunneling loop detection identifier stored in the predetermined information storing means;

error processing starting means for, when a result in one of the static identifier comparing means and the identifier comparing means shows the agreement therewith, starting detection error processing on a tunneling loop; and identifier duplication control means for, when both the results in the static identifier comparing means and the identifier comparing means do not show the agreement, controlling the identifier inserting means so that the tunneling loop identifier included in the header of the packet received by the packet receiving means is inserted as the tunneling loop detection identifier into the header of the tunnel packet and the tunneling loop identifier included in the header of the packet received by the packet receiving means is stored in the predetermined information storing means.

The above-mentioned configuration enables the tunneling loop detection identifier to be propagated in a state inserted into the header of the tunnel packet and further a tunnel loop to be detected when this tunneling loop detection identifier agrees with unique information specifying itself or when each tunnel entry point stores the dynamic portion of this tunneling loop detection identifier at the propagation and the tunneling loop detection identifier in the received packet agrees with the tunneling loop detection identifier stored.

Furthermore, combined with the above-mentioned configuration, the tunneling loop detection control apparatus according to the present invention comprises memory control means for executing control so that, when a predetermined period of time elapses from the storage, the tunneling loop detection identifier stored in the predetermined information storage means is released from the predetermined information storage means.

The above-mentioned configuration enables saving a resource for a memory to be used for storing a tunneling loop detection identifier.

The present invention has the above-mentioned configurations and provides the effects and advantages in that a tunnel entry point can detect the presence of a tunneling loop.

BEST MODE FOR CARRYING OUT THE INVENTION

With reference to the drawings, a description will be given herein below of a method and apparatus according to an embodiment of the present invention whereby a tunnel entry point detects the presence of a tunneling loop.

According to the present invention, basically, an identifier (ID) is to be included in a TEL option when a tunnel entry point newly inserts the TEL option into a tunnel packet header.

In a case in which a TEL option having an identifier is originally included in a payload packet, this identifier is simply copied into an identifier field (limit field) of the TEL option inserted into a tunnel packet header. On the other hand, if a payload packet originally contains no TEL option with an identifier, a tunnel entry point adds an identifier to an identifier field (ID field) of a TEL option inserted into a tunnel packet header.

Figure 1A:
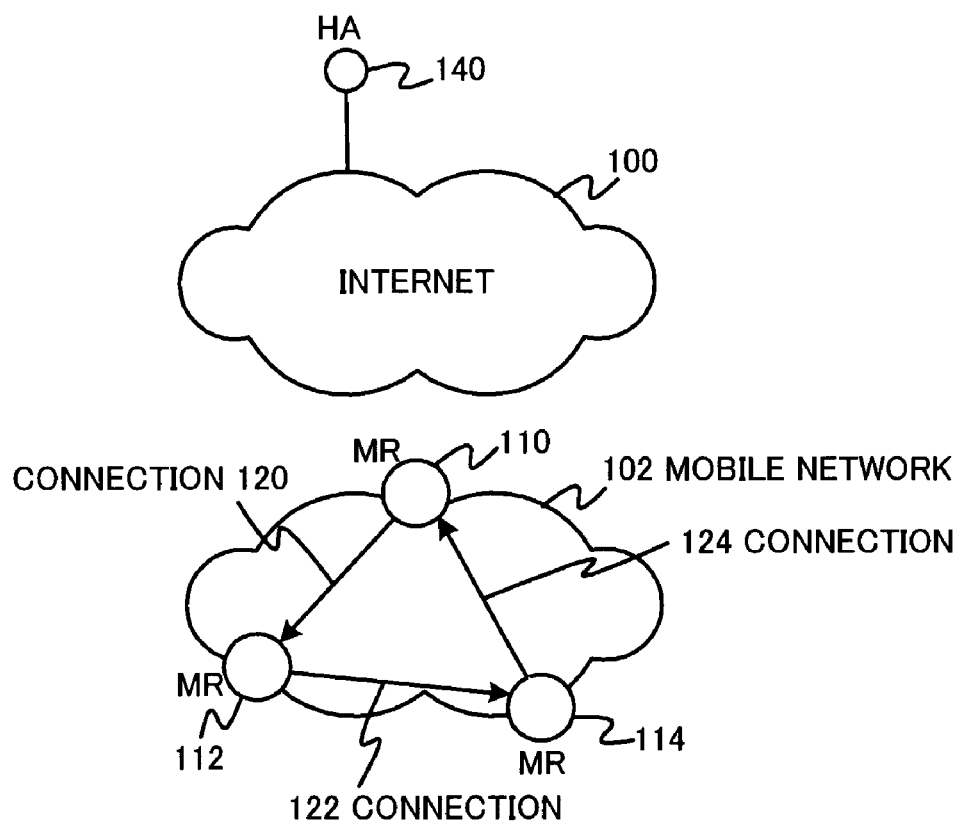
FIG. 1A is an illustration of an example of a first configuration of a conventional technique where it is expected that a tunneling loop occurs.
Figure 1B:
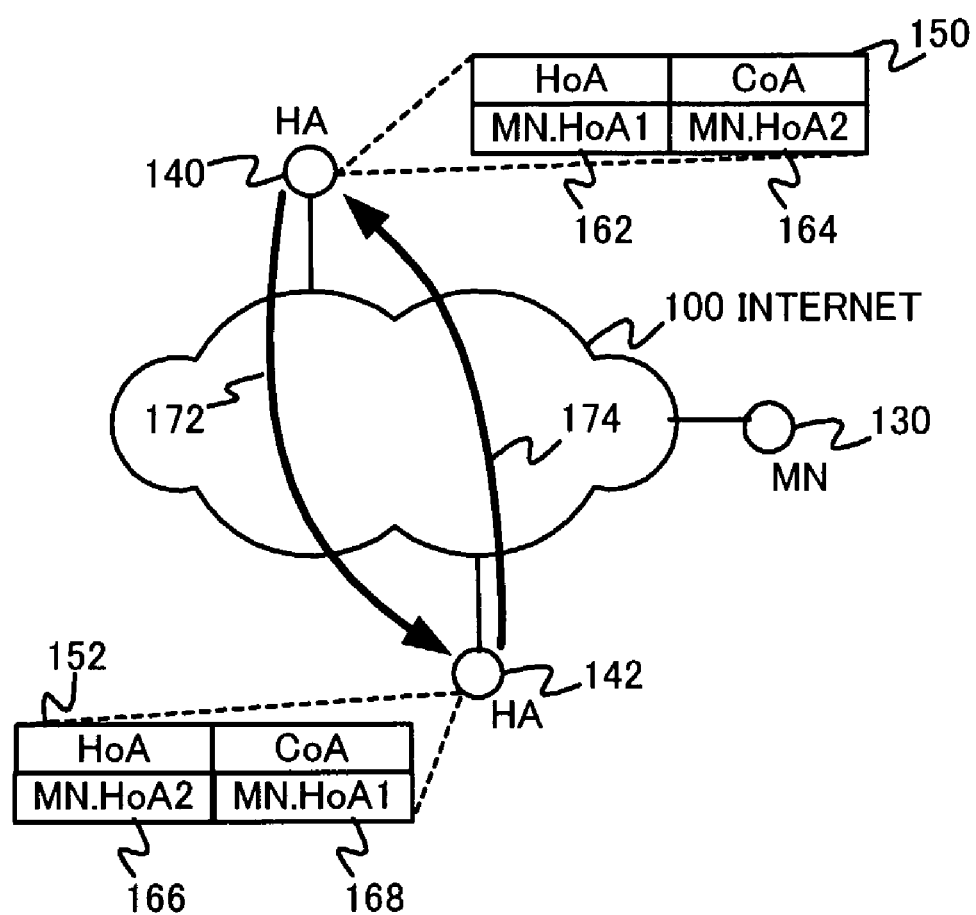
FIG. 1B is an illustration of an example of a second configuration of a conventional technique where it is expected that a tunneling loop occurs.
Figure 1C:
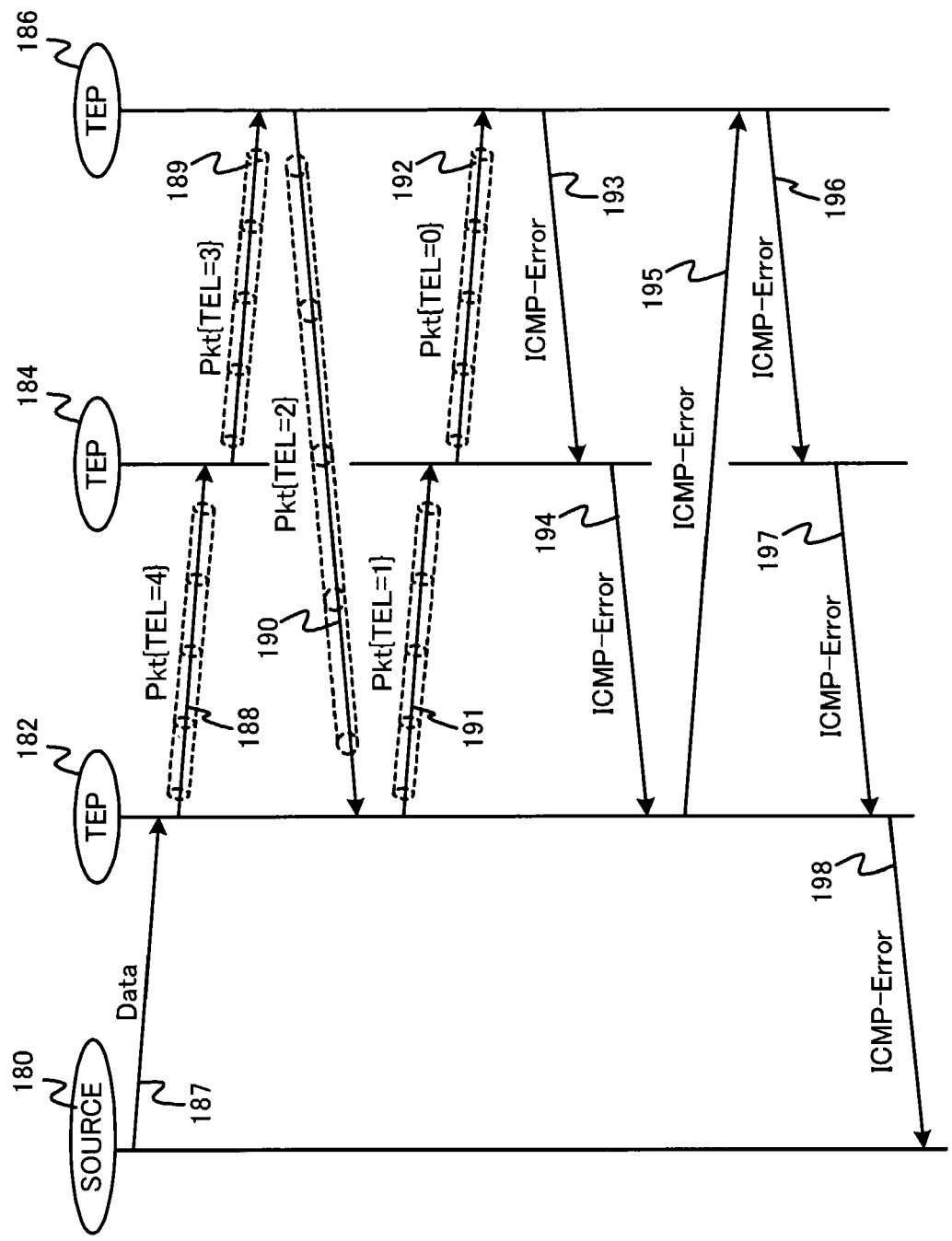
FIG. 1C is an illustration of one example of a sequence chart of an operation according to a conventional technique.
Figure 2:
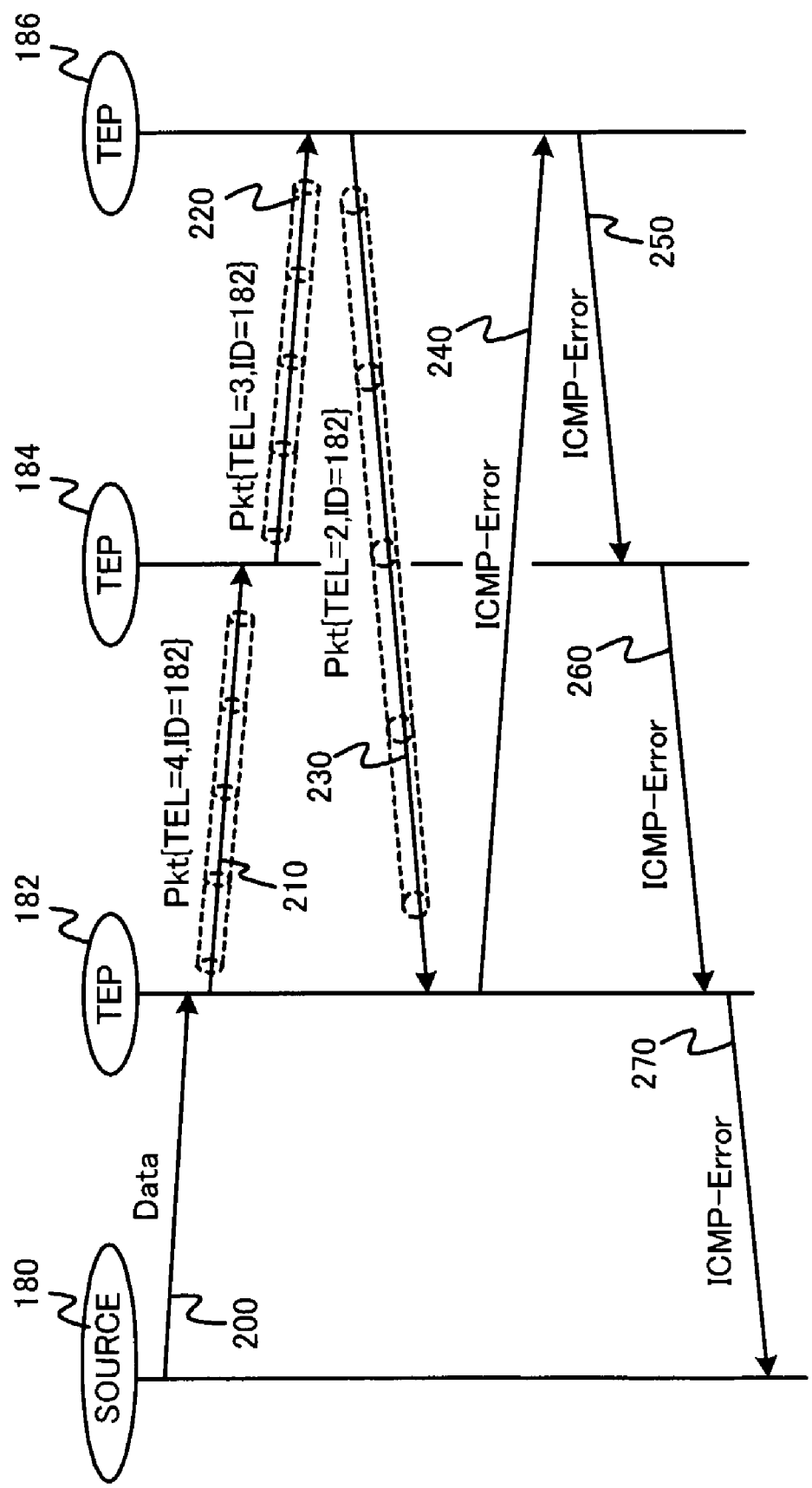
FIG. 2 is an illustration of one example of a sequence chart of an operation in the case of the employment of a static identifier according to an embodiment of the present invention.

FIG. 2 is an illustration of one example of an operation according to an embodiment of the present invention. A message sequence chart shown in FIG. 2 is for explaining one example of a method, whereby a tunnel entry point can detect a loop, according to the present invention.

A source node 180 (in FIG. 2, expressed as source) is a data transmitting node which transmits data packets to an arbitrary destination. The packets go through a path by way of three tunnel entry points (TEP 182, TEP 184, TEP 186). In this case, let it be assumed that the three tunnel entry points form a tunneling loop due to mis-configuration or for other reasons.

In a case in which the source node 180 transmits a data packet 200, the data packet 200 arrives at the first tunnel entry point (TEP 182). TEP 182 encapsulates the data packet 200 into a tunnel packet 210 and adds a TEL option to a tunnel packet header. Since the packet 200 does not contain any TEL option, in the TEL option of the tunnel packet 210, default value (for example, 4) is set in a limit field and an identifier (for example, 182) of TEP 182 is set in an identifier field.

The tunnel packet 210 (in FIG. 2, expressed as Pkt {TEL=4, ID=182}) reaches the TEP 184. In TEP 184, since no identifier of TEP 184 itself exists in an identifier field of a TEL option of the tunnel packet 210, the tunnel packet 210 is encapsulated into the tunnel packet 220. Since the payload packet 210 contains a TEL option, TEP 184 adds a new TEL option to the tunnel packet 220. This new TEL option added to the tunnel packet 220 has a limit field in which set is a value (i.e., 3) obtained by subtracting 1 from the value of the limit field of the TEL option in the payload packet 210 and an identifier field in which set is a value (i.e., 182) equal to the identifier field of the TEL option in the packet 210.

Moreover, the tunnel packet 220 (in FIG. 2, expressed as Pkt {TEL=3, ID=182}) reaches TEP 186 and, since no identifier for TEP 186 itself exists in the identifier field of the TEL option in the tunnel packet 220, TEP 186 further encapsulates it into the tunnel packet 230. Since the payload packet 220 contains a TEL option, TEP 186 adds a new TEL option to the tunnel packet 230. This new TEL option added to the tunnel packet 230 has a limit field in which set is a value (i.e., 2) obtained by subtracting 1 from the value of the limit field of the TEL option in the payload packet 220 and an identifier field in which set is a value (i.e., 182) equal to the identifier field of the TEL option in the packet 220.

Following this, the tunnel packet 230 (in FIG. 2, expressed as Pkt {TEL=2, ID=182}) is returned to TEP 182. The TEP 182 checks the received packet 230 to find that the packet 230 includes a TEL option having an identifier field in which set is a value equal to its own identifier. This indicates to the TEP 182 that a tunneling loop has occurred.

Accordingly, TEP 182 discards the packet and returns an ICMP error message 240 (in FIG. 2, expressed as ICMP-Error) indicative of the detection of a tunneling loop to the transmitter (i.e., TEP 186) of the packet 230. Upon receipt of the ICMP error message 240, TEP 186 returns an ICMP error message 250 (in FIG. 2, expressed as ICMP-Error) to TEP 184. Likewise, TEP 184 returns an ICMP error message 260 (in FIG. 2, expressed as ICMP-Error) to TEP 182. Lastly, TEP 182 sends back an ICMP error message 270 (in FIG. 2, expressed as ICMP-Error) to the first source node 180.

Figure 3:
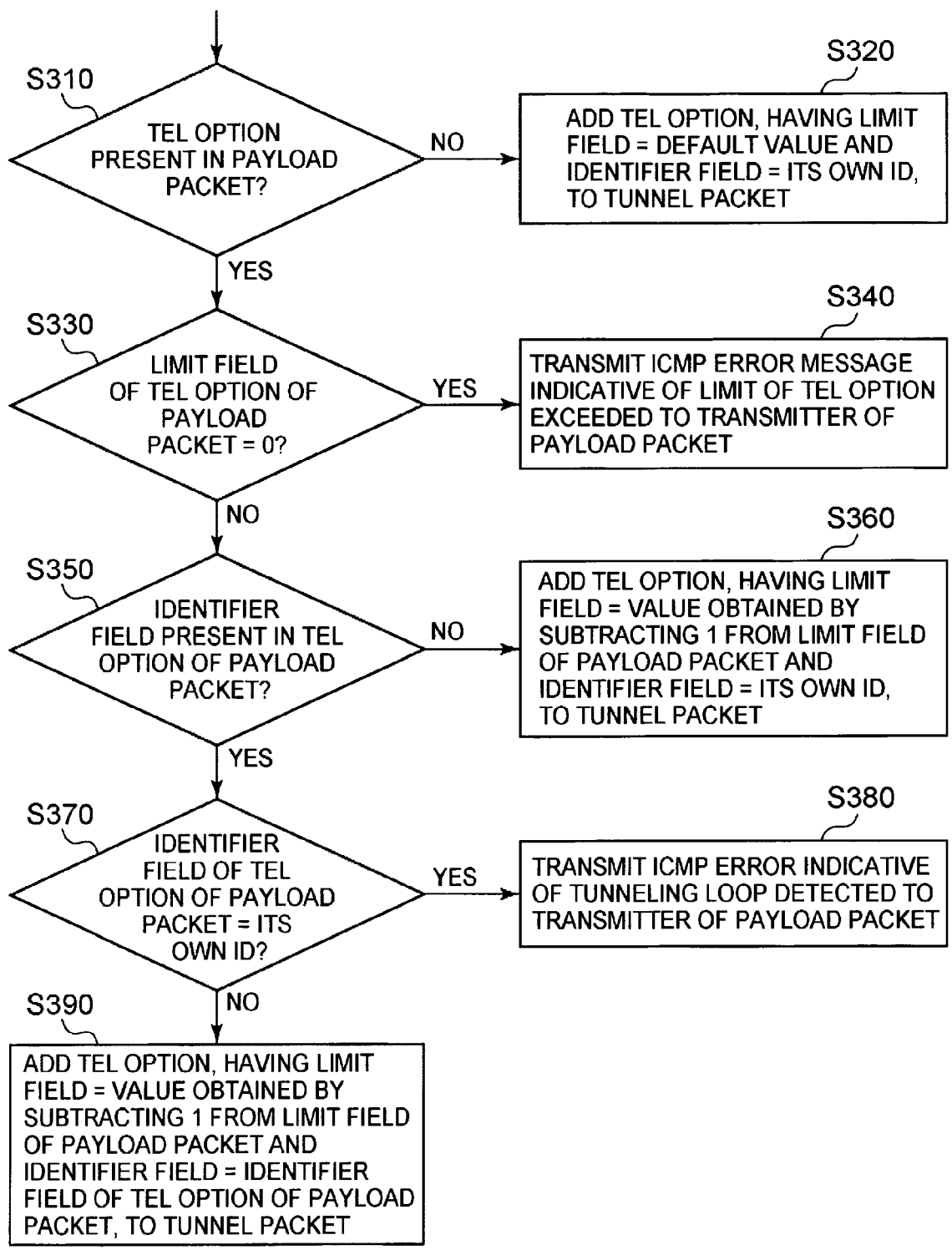
FIG. 3 is an illustration of a suitable flow chart of an algorithm to be used by a tunnel entry point for the processing on a packet when a static identifier is used in an embodiment of the present invention.

FIG. 3 is an illustration of a suitable flow chart of an algorithm to be used by a tunnel entry point for the processing on a payload packet encapsulated, according to an embodiment of the present invention.

First of all, in a step S310, a check is made as to whether or not a TEL option exists in a destination option header of a payload packet.

If the step S310 indicates that the TEL option does not exist, the operational flow advances to a step S320 where a tunnel entry point encapsulates the payload packet and adds a TEL option to the destination option header of the tunnel packet. At this time, the TEL option added thereto is equipped with a limit field in which set is a default value for the tunnel entry point and an identifier field in which set is an identifier of the tunnel entry point.

On the other hand, if the step S310 indicates that the TEL option is included in the payload packet, the operational flow proceeds to a step S330 to check the limit field of the TEL option in the payload packet. If the check indicates that the value of the limit field is zero, a step S340 follows to return an ICMP error message to the source of the payload packet. This ICMP error message is set so as to indicate the fact that the limit of the tunnel encapsulation is exceeded.

If the check in the step S330 indicates that the value of the limit field is not zero, a step S350 follows to check whether or not an identifier field is included in the TEL option of the payload packet.

If the step S350 indicates no inclusion of the identifier field in the TEL option, a step S360 follows to encapsulate the payload packet and add a TEL option to the tunnel packet header. At this time, the TEL option added to the tunnel packet header contains a limit field having a value obtained by subtracting 1 from the value of the limit field of the TEL option in the payload packet and an identifier field in which set is an identifier of the tunnel entry point.

On the other hand, if the step S350 indicates the inclusion of the identifier field in the TEL option of the payload packet, the operational flow advances to a step S370 to check whether or not the identifier field of the TEL option in the payload packet has the same value as that of the identifier of the tunnel entry point itself.

If they have the same values, a tunneling loop is detected. Then, in a step S380, an ICMP error message to the effect of the detection of the tunneling loop is sent back to the source of the payload packet.

On the other hand, if the step S370 indicates that the identifier of the tunnel entry point is not included in the identifier field of the TEL option in the payload packet, a step S390 follows to encapsulate the payload packet and add a TEL option to the tunnel packet header. The TEL option added to the tunnel packet header contains a limit field having a value obtained by subtracting 1 from the value of the limit field of the TEL option in the payload packet and an identifier field in which set is an identifier of the identifier field of the TEL option in the payload packet.

Figure 4:
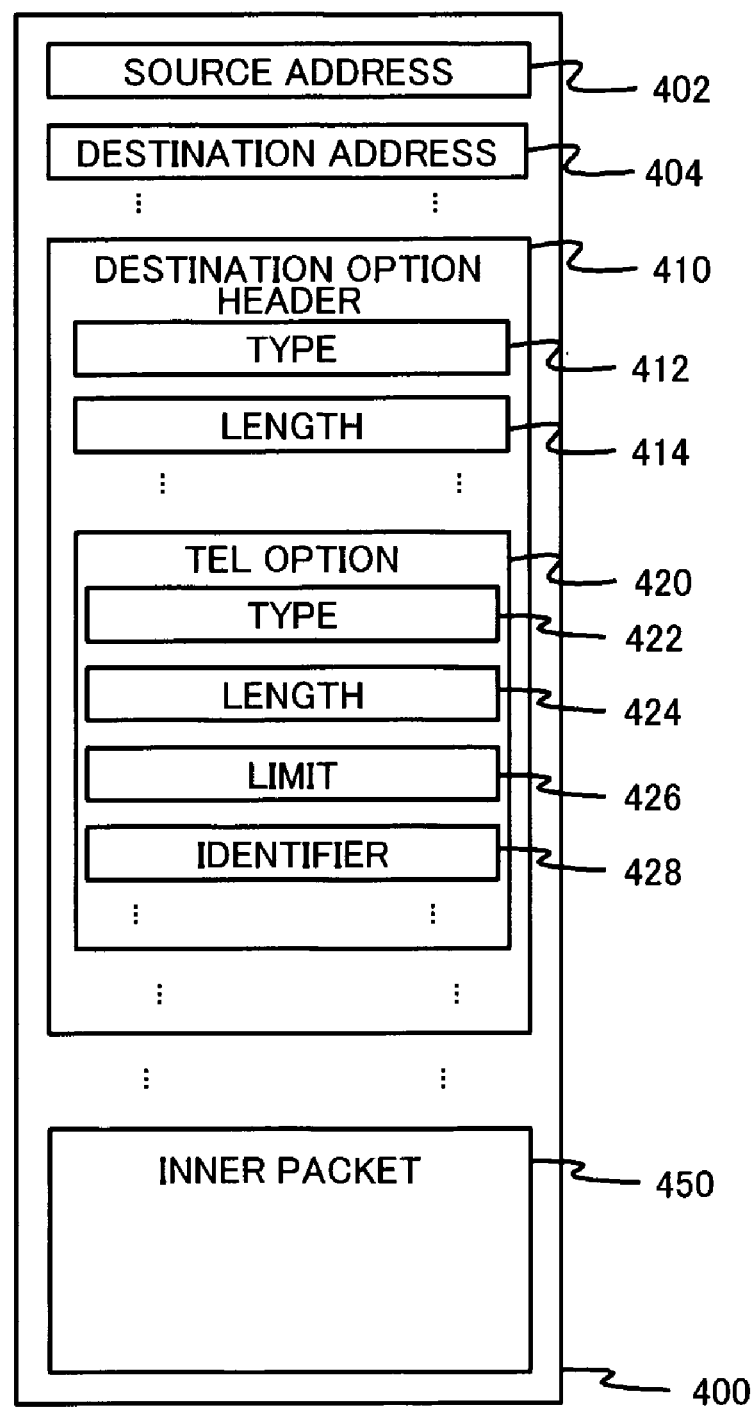
FIG. 4 is an illustration of one example of a suitable packet format for a tunnel packet including a TEL option according to an embodiment of the present invention.

FIG. 4 is an illustration of one example of a suitable packet format for a tunnel packet 400 including a TEL option according to an embodiment of the present invention. In the tunnel packet 400, an inner packet 450 is encapsulated as a payload. The detailed contents of the packet 450 will be omitted for clear illustration only.

A source address filed 402 contains an address of a tunnel entry point and a destination address filed 404 contains an address of a tunnel exit point. These two fields are fields of a standard IPv6 header. A person skilled in the art would notice that the certain fields of a standard IPv6 packet are omitted for clear illustration only.

Moreover, a TEL option 420 forms a destination option and resides in a destination option header 410 of the packet 400. The destination option header 410 contains a type field 412 whereby the destination option header 410 is identifiable and a length field 414 indicative of the length of the entire destination option header 410.

A person skilled in the art would recognize that the type field 412 actually does not reside in the destination option header 410 but resides in the header immediately before the destination option header 410. In this case, there is used a simplified technical expression for facilitation of explanation as mentioned above since the disposition of the type field before the destination option header 410 may cause confusion in explanation.

The destination option header 410 contains one or more destination options. The TEL option 420 is one of such options. The TEL option 420 contains a type field 422 and a length filed 424. The type field 422 can identify that this option is the TEL option 420, while the length field 424 shows the length of the entire TEL option 420.

In addition, in the TEL option 420, there exist a limit field 426 for specifying the maximum number of encapsulations this packet 400 can undergo and a new identifier field 428. A person skilled in the art would recognize that, in FIG. 4, the other fields in the TEL option are omitted for clear illustration.

According to the present invention, the identifier field 428 is further added to the technique disclosed in the Non-Patent Document 1. As mentioned in this specification, the identifier field 428 fulfills an important role when the tunnel entry point detects the formation of a tunneling loop.

Figure 5:
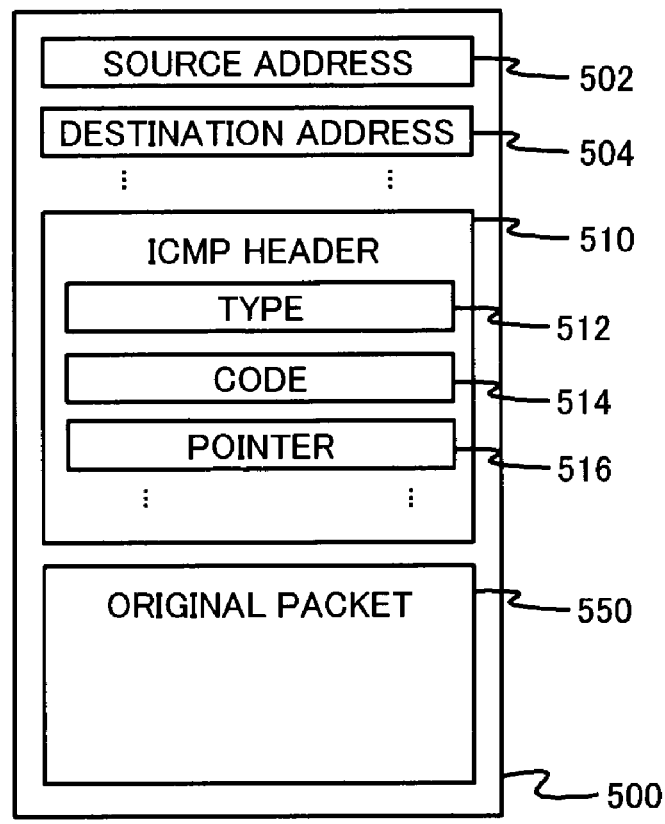
FIG. 5 is an illustration of one example of a suitable packet format for an ICMP error message according to an embodiment of the present invention.

FIG. 5 is an illustration of one example of a suitable packet format of an ICMP error message 500 in an embodiment of the present invention.

A source address field 502 contains an address of the transmitter and a destination address field 504 contains an address of a receiver. These two fields are a field of the standard IPv6 header. A person skilled in the art would recognize that the certain fields of the standard IPv6 packet are omitted for simplicity of illustration.

As an ICMP error message, the packet 500 contains an ICMP header 510 and further contains the original packet 550, where an error has occurred, whenever possible. A type field 512 of the ICMP header 510 indicates the type of an ICMP message of the packet 500. Moreover, a code field 514 of the ICMP header 510 indicates a message code related to this ICMP error. Still moreover, a pointer field 516 of the ICMP header 510 is used for indicating a byte where an error has occurred in the original packet 550 (the place where the error has been found).

The present invention employs two preferred ICMP error messages.

The first is an ICMP error message representative of the fact that a limit (upper limit) of tunnel encapsulation has been exceeded. In this case, preferably, a pointer field 516 contains a value indicative of a limit field of the TEL option of the original packet 550.

The second is an ICMP error message representative of the fact that a tunneling loop has occurred. In this case, preferably, the pointer field 516 contains a value indicative of an identifier field of the TEL option of the original packet 550.

A person skilled in the art would grasp that the ICMP error message can indicate a "tunnel encapsulation limit exceeded" error or a "tunneling loop detected" error by setting special combinations of bits in the type field 512, the code field 514 and the pointer field 516.

In this specification, each of the ICMP error message indicative of "tunnel encapsulation limit exceeded" error and the ICMP error message indicative of "tunneling loop detected" error will hereinafter be referred to simply as an ICMP error message.

Moreover, in the above description, arbitrary character strings or bits unique to the respective tunnel entry points are assumed as identifiers to be inserted into TEL options by the tunnel entry points.

Some preferred examples will hereinbelow be described with respect to identifiers. A person skilled in the art would appreciate that these examples are only for illustrations and the actual form of the identifier is not limited to these examples.

One form of the identifier is merely for each tunnel entry point to use its own IP address. This provides an advantage of guaranteeing the global uniqueness of the identifier. In addition, as a variation of this form, it is also acceptable to use a result of the operation of a hash function of the IP address of the tunnel entry point. This provides an advantage that the reliability is unique at a high level and further size reduction is feasible.

The above-described embodiment of the present invention can guarantee the detection of tunneling loops by the tunnel entry point when the first tunnel entry point forms a part of the loop. However, the tunnel entry points (except the first tunnel entry point) on the loop cannot detect the loop. This will be described hereinbelow with reference to FIGS. 6A and 6B.

Figure 6A:
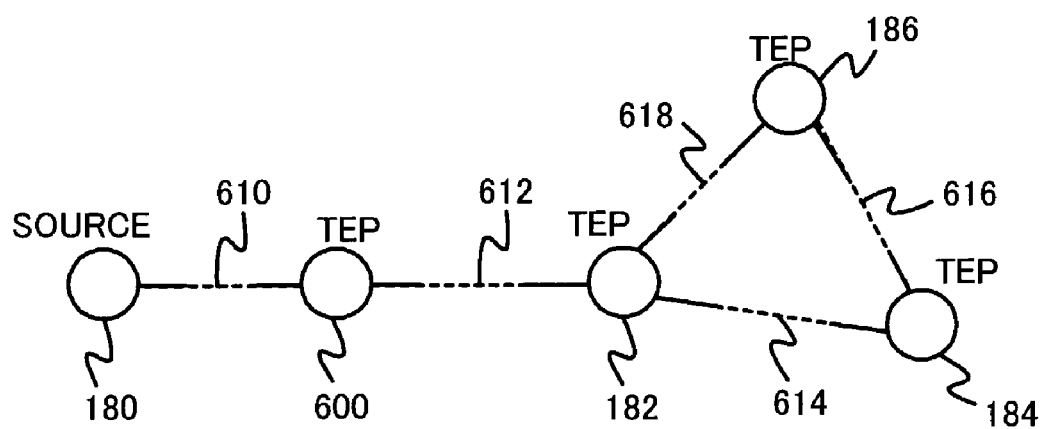
FIG. 6A is an illustration of an example of a configuration according to an embodiment of the present invention in a case in which a first tunnel entry point does not lie in a loop.

In FIG. 6A, a source node 180 (in FIG. 6A, expressed as source) is a data transmitting node for transmitting data packets to an arbitrary destination. A packet transmitted from the source node 180 goes through a path by way of four tunnel entry points (TEP 600, TEP 182, TEP 184, TEP 186). However, in this case, the three tunnel entry points (TEP 182, TEP 184, TEP 186) establishes a tunneling loop due to mis-configuration or for other reasons. Data paths 610, 612, 614, 616 and 618 define a continuos route through which packets pass. Although other intermediate routers can exist along these route segments, they are omitted from the illustration.

Figure 6B:
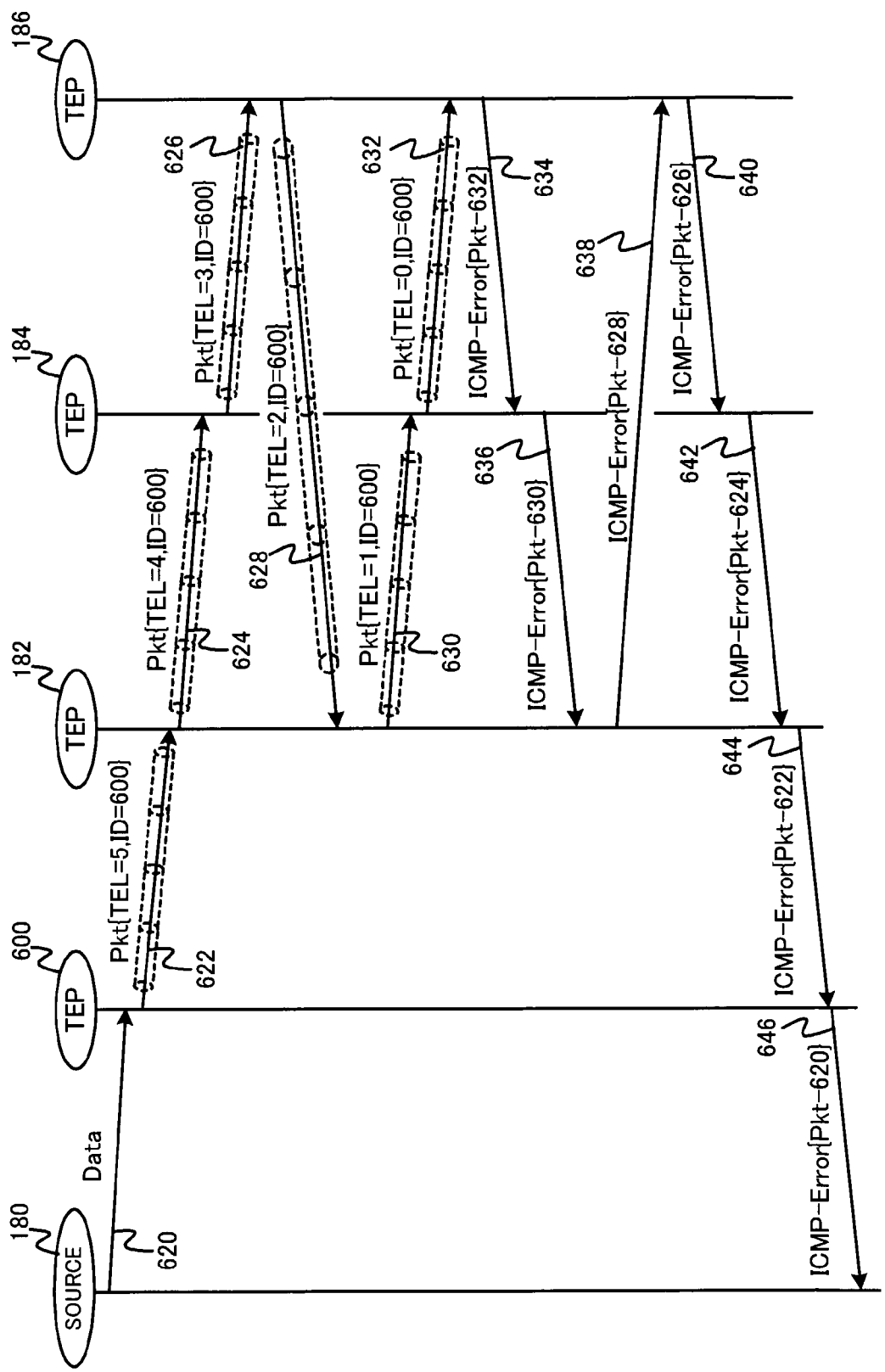
FIG. 6B is an illustration of one example of a sequence chart when a source node transmits a data packet in the configuration shown in FIG. 6A.

FIG. 6B shows a message sequence when, in the configuration shown in FIG. 6A, the source node 180 transmits a data packet 620.

The data packet 620 (in FIG. 6B, expressed as Data) is encapsulated into a tunnel packet 622 when arriving at the first tunnel entry point (TEP 600). TEP 600, which is the first entry point, inserts a TEL option into the tunnel packet 622.

The TEL option has a limit field with a value of, for example, "5" and an identifier field having a value equal to the identifier (for example, "600") of TEP 600.

Moreover, a tunnel packet 622 (in FIG. 6B, expressed as Pkt {TEL=5, ID=600}) goes through the path 612 and then reaches TEP 182. Since the packet 622 already contains the TEL option having an identifier field and the identifier of TEP 182 itself does not exist in the identifier field of the TEL option of the tunnel packet 622, in TEP 182 the packet 622 is simply encapsulated into the tunnel packet 624 and the original TEL option is copied to the tunnel packet 624 and the limit field of the new TEL option is decremented by one. That is, a value obtained by subtracting 1 from the value of the limit field of the original TEL option added to the packet 622 is set in the limit field of the TEL option of the tunnel packet 624.

Still moreover, the tunnel packet 624 (in FIG. 6B, expressed as Pkt {TEL=4, ID=600}) reaches TEP 184 through the path 614. Likewise, since the packet 624 already contains the TEL option having an identifier field and the identifier of TEP 184 itself does not exist in the identifier field of the TEL option of the tunnel packet 624, in TEP 184 the packet 624 is simply encapsulated into the tunnel packet 626 and the original TEL option is copied to the tunnel packet 626 and the limit field of the new TEL option is decremented by one. That is, a value obtained by subtracting 1 from the value of the limit field of the original TEL option added to the packet 624 is set in the limit field of the TEL option of the tunnel packet 626.

Yet moreover, the tunnel packet 626 (in FIG. 6B, expressed as Pkt {TEL=3, ID=600}) reaches TEP 186 through the path 616. Also in this case, since the packet 626 already contains the TEL option having an identifier field and the identifier of TEP 186 itself does not exist in the identifier field of the TEL option of the tunnel packet 626, in TEP 186 the packet 626 is simply encapsulated into the tunnel packet 628 and the original TEL option is copied to the tunnel packet 628 and the limit field of the new TEL option is decremented by one. That is, a value obtained by subtracting 1 from the value of the limit field of the original TEL option added to the packet 626 is set in the limit field of the TEL option of the tunnel packet 628.

In addition, the tunnel packet 628 (in FIG. 6B, expressed as Pkt {TEL=2, ID=600}) reaches TEP 182 through the path 618. When TEP 182 has again received the packet 628, since the identifier field of the TEL option has the identifier of "600", it is impossible for TEP 182 to detect the fact of the occurrence of a loop, and TEP 182 will continuously encapsulate the packet 628 into the tunnel packet 630.

Thus, it is seen that the method of using only a unique identifier as the value of the identifier field of the TEL option is insufficient to detect a loop.

As a method of enabling the loop detection, there is a method in which each tunnel entry point monitors an ICMP error, it receives, to infer therefrom whether a loop has occurred or not. This will hereinbelow be described with reference to the succeeding sequence.

As shown in FIG. 6B, after the multiple encapsulations by TEP 182, TEP 184 and TEP 186 on the tunneling loop, the limit field of the TEL option of the tunnel packet 632 reaches zero when reaching. TEP 186. Accordingly, TEP 186 cannot further carry out the packet encapsulation. Instead, TEP 186 transmits, to the source of the tunnel packet 632, an ICMP error message 634 (in FIG. 6B, expressed as ICMP-Error {Pkt-632}) indicative of the fact that the limit of the tunnel encapsulation has been overrun. The ICMP error message 634 contains the original tunnel packet 632.

Upon receipt of the ICMP error message 634, TEP 184 grasps that the limit of the tunnel encapsulation has been overrun. Moreover, TEP 184 extracts the original packet 630, and puts this packet 630 in an ICMP error message 636 (in FIG. 6B, expressed as ICMP-Error {Pkt-630}) and transmits it to the source (i.e., TEP 182) of the packet 630. At the same time, for making reference afterwards, TEP 184 stores this ICMP error message 634 (or, a value of the identifier field of the TEL option of the packet where an error has occurred) for a given short time period (i.e., temporarily).

Likewise, upon receipt of the ICMP error message 636, TEP 182 grasps that the limit of the tunnel encapsulation has been overrun. Moreover, TEP 182 extracts the original packet 628, and puts this packet 628 in an ICMP error message 638 (in FIG. 6B, expressed as ICMP-Error {Pkt-628}) and transmits it to the source (i.e., TEP 186) of the packet 628. At the same time, for making reference afterwards, TEP 182 stores this ICMP error message 636 (or, a value of the identifier field of the TEL option of the packet where an error has occurred) for a given short time period.

Furthermore, likewise, TEP 186 and TEP 184 again store ICMP error messages 638 and 640 (or, a value of the identifier field of the TEL option of the packet where an error has occurred) and return ICMP error messages 640 and 642.

In a case in which an ICMP error propagates through a loop so as to go from TEP 186 through TEP 184 and return to TEP 182, the purpose of storing the ICMP error message (or, a value of the identifier field of the TEL option of the packet where an error has occurred) becomes clear. That is, TEP 182, which has received the ICMP error message 642, can make a comparison between the original packet 624 residing in the ICMP error message 642 and the original packet 630 residing in the ICMP error message 636 stored previously. Moreover, TEP 182 finds that the identifier field in the TEL option of the packet 624 is identical to the identifier field in the TEL option of the packet 630 (i.e., the identifier of TEP 600). This notifies the fact of the occurrence of a tunneling loop to TEP 182.

Likewise, TEP 184 also makes a comparison between the original packet 626 residing in the ICMP error message 640 and the original packet 632 residing in the ICMP error message 634 stored previously, thereby enabling the detection of a tunneling loop. Moreover, TEP 186 stores the original packet 632 at the transmission of the ICMP error message 634, thereby enabling the detection of a tunneling loop at the reception of the ICMP error message 638 which has returned after traveling round the loop.

From the above description, it is seen that the occurrence of a tunneling loop can be estimated in a manner such that the tunnel entry point stores the received ICMP error message indicative of the fact that the limit of the tunnel encapsulation has been exceeded (or, a value of the identifier field of the TEL option of the packet where an error has occurred). When receiving a different ICMP error message within a given short time period, the tunnel entry point can make a comparison between the identifier fields of the TEL options of the original packets included in the two ICMP error messages. If both are the same, the occurrence of a tunneling loop is detectable.

Although the above-described method is considered as a method whereby, even in a case in which the first tunnel entry point does not constitute a part of the loop, the tunnel entry point can detect a tunneling loop, it does not reach a complete solving method. This will be described with reference to a message sequence chart shown in FIG. 6C.

Figure 6C:
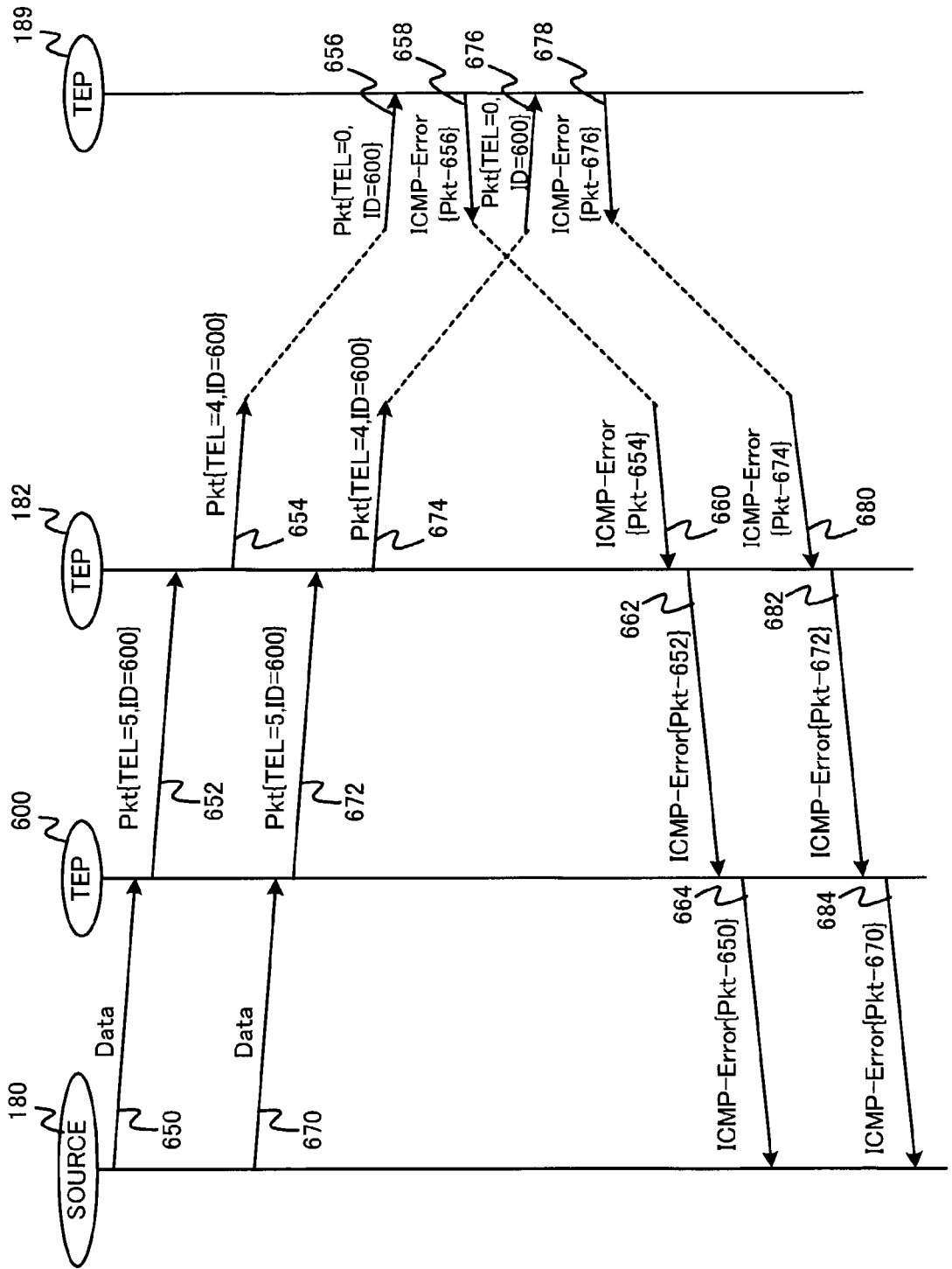
FIG. 6C is an illustration of a sequence chart of an operation in the case of a mistaken tunneling loop detection in a method related to the sequence chart shown in FIG. 6B.

In FIG. 6C, the tunnel entry points (TEP 600, TEP 182, TEP 189) does not form a loop. Tunnel entry points existing between TEP 182 and TEP 189 are omitted from the illustration. Each of these tunnel entry points does not establish a tunneling loop.

A data packet 650 (in FIG. 6C, expressed as Data) transmitted from the source node 180 is encapsulated into a tunnel packet 652 when reaching the first entry point (TEP 600). TEP 600, which is the first tunnel entry point, inserts a TEL option into the tunnel packet 652. This TEL option has a limit field with a value of, for example, "5" and an identifier field having a value equal to the identifier of TEP 600.

Moreover, the tunnel packet 652 (in FIG. 6C, expressed as Pkt {TEL=5, ID=600}) reaches TEP 182. In TEP 182, since the packet 652 already contains the TEL option having an identifier field and the identifier of TEP 182 itself does not exist in the identifier field of the TEL option of the tunnel packet 652, the packet 652 is simply encapsulated into the tunnel packet 654 and the original TEL option is copied to the tunnel packet 654 and the limit field of the new TEL option is decremented by one.

This operation is conducted until the packet reaches TEP 189 as a tunnel packet 656 (in FIG. 6C, expressed as Pkt {TEL=0, ID=600}). Since the limit field of the TEL options is reduced to zero in TEP 189, TEP 189 does not carry out further encapsulation. Alternatively, TEP 189 transmits to the source of the tunnel packet 656 an ICMP error message 658 (in FIG. 6C, expressed as ICMP-Error {Pkt-656}) indicative of the fact that the limit of the tunnel encapsulation has been exceeded.

Following this, this ICMP error message is propagated in a reverse direction and reaches TEP 182 as an ICMP error message 660 (in FIG. 6C, expressed as ICMP-Error {Pkt-654}) including the original packet 654.

As described above, TEP 182 extracts the original packet 654, and puts this packet 654 in an ICMP error message 662 (in FIG. 6C, expressed as ICMP-Error {Pkt-652}) and transmits it to the source (i.e., TEP 600) of the packet 652. At the same time, for making reference afterwards, TEP 182 stores this ICMP error message 660 for a given short time period.

Let it be assumed that the source node 180 transmits a different data packet 670 (in FIG. 6C, expressed as Data). TEP 600 encapsulates the data packet 670 into a tunnel packet 672. TEP 600, which is the first tunnel entry point, inserts a TEL option into the tunnel packet 672. This TEL option has a limit field with a value of, for example, "5" and an identifier field having a value equal to the identifier of TEP 600.

Moreover, a tunnel packet 672 (in FIG. 6C, expressed as Pkt {TEL=5, ID=600}) reaches TEP 182. Since in TEP 182 the packet 672 already contains the TEL option having an identifier field, TEP 182 simply encapsulates the packet 672 into a tunnel packet 674 and copies the original TEL option to the tunnel packet 674 and the limit field of the new TEL option is decremented by one.

This operation is conducted until the packet reaches TEP 189 as a tunnel packet 676 (in FIG. 6C, expressed as Pkt {TEL=0, ID=600}). Since the limit field of the TEL options is reduced to zero in TEP 189, TEP 189 does not carryout further encapsulation. Instead, TEP 189 transmits to the source of the tunnel packet 676 an ICMP error message 678 (in FIG. 6C, expressed as ICMP-Error {Pkt-676}) indicative of the fact that the limit of the tunnel encapsulation has been exceeded.

Following this, this ICMP error message is propagated in a reverse direction and reaches TEP 182 as an ICMP error message 680 (in FIG. 6C, expressed as ICMP-Error {Pkt-674}) including the original packet 674.

Upon receipt of the ICMP error message 680, TEP 182 makes a comparison between the original packet 654 existing in the ICMP error message 660 stored previously and the original packet 674 existing in the ICMP error message 680. Moreover, TEP 182 finds that the identifier field in the TEL option of the packet 654 and the identifier field in the TEL option of the packet 674 are identical to each other (i.e., the identifier of TEP 600). Thus, there is a possibility that TEP 182 reaches the conclusion that a tunneling loop has occurred.

From the above description, although, when the first tunnel entry point lies on a loop, the tunnel entry point can accurately detect a tunneling loop by using a unique identifier (for example, an IP address or a hash value of an IP address), in a case in which the first tunnel entry point does not exist on the loop, the accuracy of the detection of the tunneling loop decreases.

Furthermore, in order to enhance the accuracy in the case of no existence of the first tunnel entry point on the loop while employing the unique identifier, there is a possible method of not only copying an identifier field of an TEL option in each TEP but also adding its own unique identifier (for example, its own IP address or a calculation result obtained by the calculation of its own IP address based on a hash function. In this case, whenever the TEP performs encapsulation, a unique identifier is added to the identifier field in the TEL option with respect to TEP which has performed the encapsulation. In addition, when the packet again returns to the TEP, through which it has once passed, after looping, if it is found that its own unique identifier agrees with the identifier field of the TEL option, TEP can detect a tunneling loop without depending on the structure of the loop.

Although this method can enhance the accuracy of detection of a tunneling loop in a case in which the first tunnel entry point does not lie on the loop, since not only the size of the identifier sufficiently unique in a network is relatively large but also one TEP copies a series of identifiers of TEPs through which the packet has passed previously and adds its own identifier, there is a need to accept an increase in overhead of the packet. Moreover, although it is considerable to employ a method of, after removing a series of identifiers of the original packets, inserting a series of identifiers having its own added identifier into an encapsulated packet, there is a need to permit that a node (packet transferring node) other than the packet source and destination changes an inner packet, which involves the risk on security.

For solving the problems related to the unique identifiers, there is a possible method of using different numeric values as identifiers with respect to different tunnel packets. This is realizable by employing a numeric value generator (number generator) which is made to generate a series of different numeric values to be used as identifiers. Preferably, this numeric value generator is designed to be capable of generating numeric values at random or according to a predetermined sequence (for example, ascending order, descending order, pseudo random number, and others).

Figure 7:
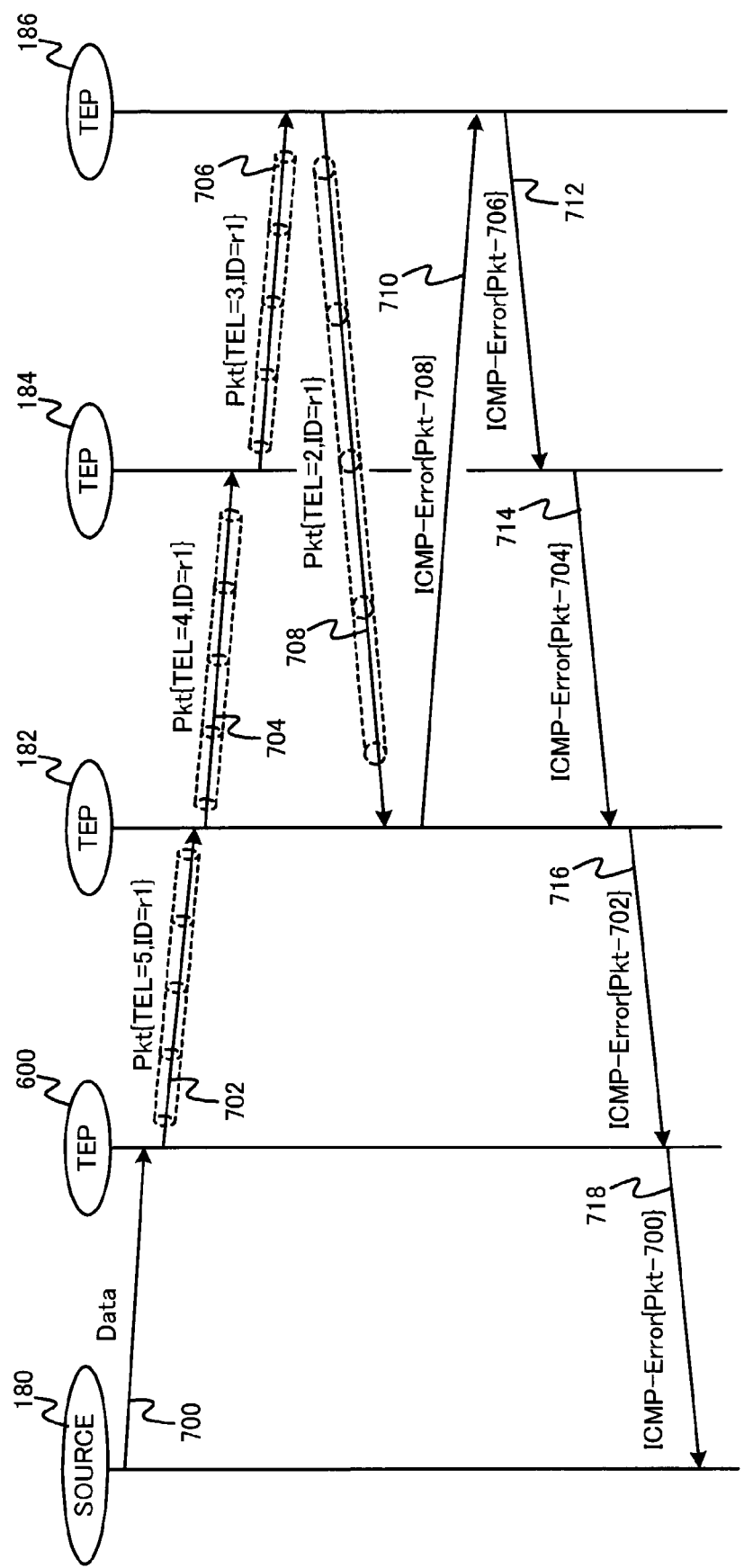
FIG. 7 is an illustration of one example of a sequence chart of an operation in a case in which a static identifier is used in an embodiment of the present invention.

FIG. 7 shows a method of, even in a case in which the first tunnel entry point does not lie on a loop, enabling the detection of a tunneling loop by using different numeric values as identifiers in an embodiment of the present invention.

In FIG. 7, the tunnel entry points (TEPs 600, 182, 184 and 186) are disposed as shown in FIG. 6A. When the source node 180 transmits a data packet 700 (in FIG. 7, expressed as Data), the packet 700 reaches the first tunnel entry point (TEP 600).

TEP 600 encapsulates the packet 700 into a tunnel packet 702 having a new TEL option. The limit field of the TEL option has a default value of, for example, "5" and an identifier value of, for example, "r1". The identifier value is generated by TEP 600.

Moreover, the tunnel packet 702 (in FIG. 7, expressed as Pkt {TEL=5, ID=r1}) reaches TEP 182 by way of a path 612. Since the identifier field of the TEL option in the tunnel packet 702 does not agree with the identifier (identifier whereby the packet which was transferred previously is identifiable) temporarily stored in TEP 182, when reaching TEP 182, this packet 702 is further encapsulated into a tunnel packet 704. Since the original packet 702 contains a TEL option, TEP 182 simply copies the TEL option of the tunnel packet 702 to the tunnel packet 704 and reduces the value of the limit field to 4. In addition, TEP 182 stores the value "r1" of the identifier for a given short period time. This purpose will become clear afterwards.

Furthermore, the tunnel packet 704 (in FIG. 7, expressed as Pkt {TEL=4, ID=r1}) reaches the next tunnel entry point (TEP 184). TEP 184 further encapsulates the tunnel packet 704 into a tunnel packet 706. Since the original packet 704 contains a TEL option, TEP 184 simply copies the TEL option of the tunnel packet 704 to the tunnel packet 706 and reduces the value of the limit field to 3. Likewise, TEP 184 stores the value "r1" of the identifier for a given short period time.

Still furthermore, the tunnel packet 706 (in FIG. 7, expressed as Pkt {TEL=3, ID=r1}) reaches the next tunnel entry point (TEP 186). Since the identifier field of the TEL option in the tunnel packet 706 does not agree with the identifier (identifier whereby the packet which was transferred previously is identifiable) temporarily stored in TEP 186, TEP 186 further encapsulates the tunnel packet 706 into a tunnel packet 708. Since the original packet 706 contains a TEL option, TEP 186 simply copies the TEL option of the tunnel packet 706 to the tunnel packet 708 and reduces the value of the limit field to 2. In addition, likewise, TEP 186 also stores the value "r1" of the identifier for a given short period time.

Yet furthermore, when the tunnel packet 708 (in FIG. 7, expressed as Pkt {TEL=2, ID=r1}) again reaches the TEP 182, TEP 182 makes a comparison between the identifier of the tunnel packet 708 and the value of the identifier temporarily stored previously. Moreover, TEP 182 notices that the values of the identifiers are equal to each other and decides that a tunneling loop has been detected. This is because the values of the identifiers are generated such that different tunnel packets have different identifiers and the reception of the tunnel packet having the identifier value equal to that of the packet received previously indicates the occurrence of a tunneling loop.

Incidentally, since a plurality of tunnel packets are handled in the actual environment, whenever detecting new identifiers, TEP can successively store the detected new identifiers and successively delete the old identifiers.

In consequence, TEP 182 transmits an ICMP error message 710 (In FIG. 7, ICMP-Error {Pkt-708}) to the transmitter (i.e., TEP 186) of the tunnel packet. The ICMP error message 710 contains the original tunnel packet 708 and the error signifies a "tunneling loop detected" type.

In addition, this error is propagated to the source node 180 in a reverse direction through ICMP error messages 712, 714, 716 and 718 (in FIG. 7, respectively expressed as ICMP-Error {Pkt-706}, ICMP-Error {Pkt-704}, ICMP-Error {Pkt-702} and ICMP-Error {Pkt-700}).

Figure 8:
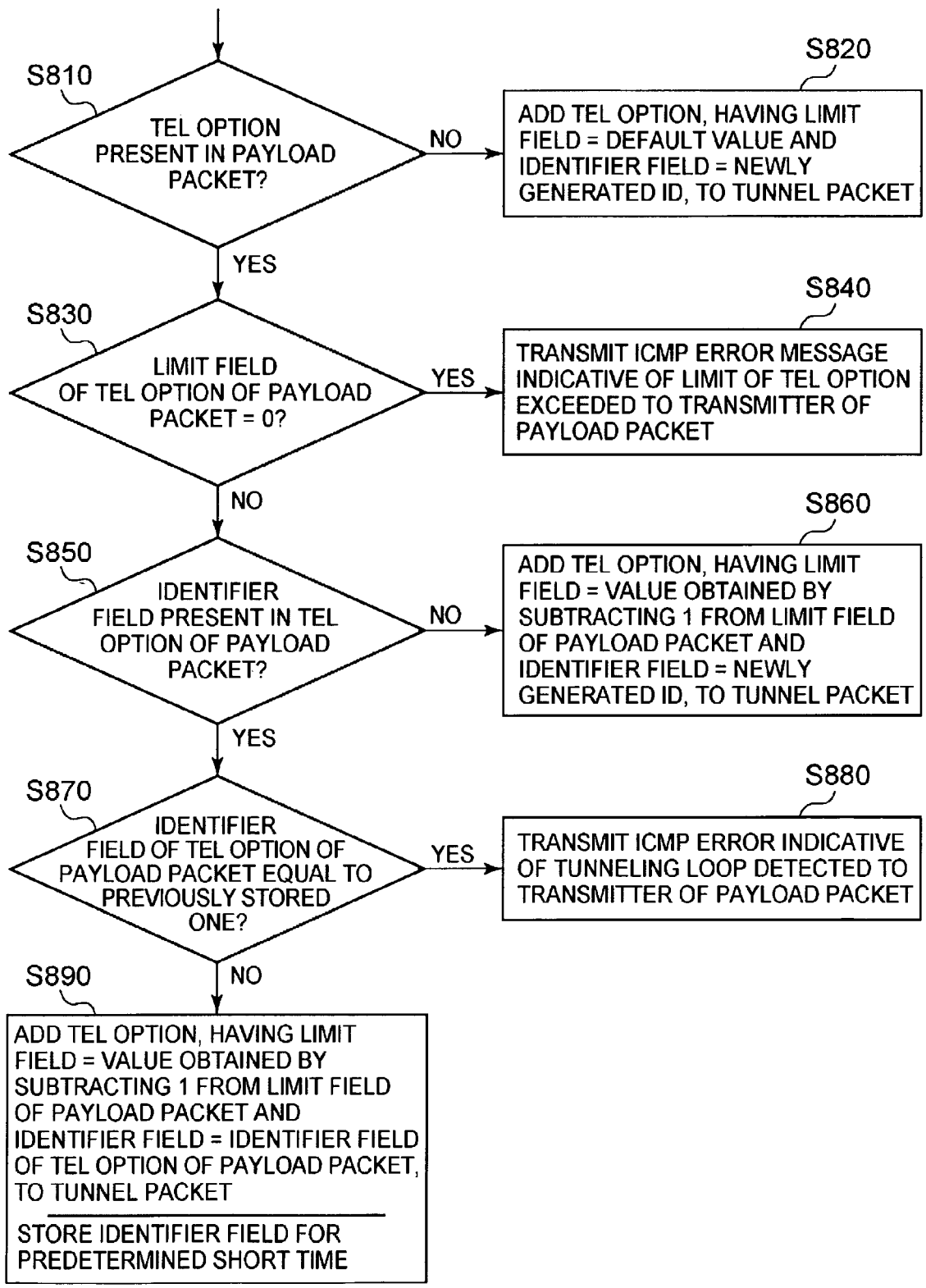
FIG. 8 is an illustration of a suitable flow chart of an algorithm to be used by a tunnel entry point for the processing on a packet in a case in which a dynamic identifier is used in an embodiment of the present invention.

In a case in which the identifier field of the TEL option is produced through the use of a numeric value generator, there is a need for the tunnel entry point to detect a tunneling loop according to an algorithm (for example, algorithm shown in FIG. 8) different from the above-mentioned algorithm. FIG. 8 shows an appropriate flow chart according to an embodiment of the present invention.

First of all, in a step S810, a check is made as to whether or not a TEL option exists in a destination option header of a payload packet.

If the step S810 indicates that the TEL option does not exist therein, the operational flow advances to a step S820 where the tunnel entry point encapsulates the payload packet and adds a TEL option to the destination option header of the tunnel packet. The TEL option to be added at this time contains a limit field in which set is a default value for the tunnel entry point and an identifier field in which set is a newly generated numeric value.

On the other hand, if the step S810 indicates that the TEL option is included in the payload packet, the operational flow advances to a step S830 for checking the limit field of the TEL option of the payload packet. At this time, if the value of the limit field is zero, the operational flow proceeds to a step S840 for sending back an ICMP error message to the source of the payload packet. This ICMP error message is set so as to indicate the fact that the limit of tunnel encapsulation has been exceeded.

Moreover, in the step S830, if the limit field value is not zero, the operational flow proceeds to a step S850 for checking whether or not an identifier field is included in the TEL option of the payload packet.

If the step S850 indicates that the identifier filed is not included in the TEL option, in a step S860 the payload packet is encapsulated and the TEL option is added to the tunnel packet header. In this case, the TEL option to be added to the tunnel packet header contains a limit field having a value obtained by subtracting one from the value of the limit field of the TEL option in the payload packet and an identifier field in which a newly generated numeric value is set.

On the other hand, if the step S850 indicates that the identifier filed is included in the TEL option of the payload packet, a step S870 follows to check whether or not the identifier field of the TEL option of the payload packet is the same as the temporarily stored identifier of the tunnel packet received previously by the tunnel entry point.

If the step S870 shows that both are the same (that is, the value of the identifier field of the TEL option in the payload packet agrees with any one of the identifiers stored temporarily), a tunneling loop is detected. As a result, in a step S880, an ICMP error message indicative of the fact that the tunneling loop has been detected is transmitted to the source of the payload packet.

Meanwhile, if the step S870 shows that the value of the identifier field of the TEL option in the payload packet does not agree with any one of the identifiers stored previously, a step S890 follows to encapsulate the payload packet and add a TEL option to the tunnel packet header. In this case, the TEL option to be added to the tunnel packet header contains a limit field having a value obtained by subtracting 1 from the value of the limit field of the TEL option of the payload packet and an identifier field in which set is the identifier field of the TEL option of the payload packet. Moreover, this identifier field of the TEL option of the payload packet is stored for a given short time period by the tunnel entry point. When a time longer than the given short time period elapses, the identifier stored is released from the tunnel entry point.

Owing to the employment of a plurality of generated identifiers mentioned above, the tunnel entry point can detect a tunneling loop with higher accuracy in a case in which the first tunnel entry point does not lie on the loop in comparison with the employment of static identifiers such as IP addresses.

However, this method degrades the loop detection accuracy in a case in which the first tunnel entry point lies on a loop. This is because difficulty is experienced in guaranteeing that each tunnel entry point generates a different numeric value. That is, there is a possibility that two tunnel entry points generate the same identifiers with respect to two different tunnel packets, thus causing the tunnel entry point to detect a non-existent tunneling loop in error.

Moreover, whether or not the use of an identifier generated for the detection of a loop is feasible depends upon the size of the identifier, the period of time (above-mentioned given short time period) for which the tunnel entry point stores the identifier and the number of tunnel entry points on the loop.

In general, as the size of the identifier (i.e., the number of bits to be used for the identifier) increases, the possibility that two tunnel entry points generate the same identifiers with respect to different packets becomes lower. However, the larger the size of the identifier, the larger the size of the packet overhead or necessary memory.

Likewise, in a case in which the received identifier is stored for a long period of time, particularly when the tunneling loop is large (that is, when the tunneling loop is composed of a large number of nodes), the tunnel entry point can detect the tunneling loop with higher accuracy. However, the storage of the identifier for a long period of time requires a larger memory and increases the frequency of identifier comparison.

As a method capable of determining the length of time of the storage of the received identifier, there is a method of determining the length of time in accordance with the value of the limit field of the TEL option. This signifies that a tunnel packet having a limit field of a large value passes through a large tunneling loop with a high possibility while a tunnel packet having a small limit field may be discarded because the limit of tunnel encapsulation would reach zero before the packet travels round the loop.

From the above description, in a case in which the first tunnel entry point does not lie on the loop, the employment of a different identifier with respect to each of tunnel packets enables the tunnel entry point to detect a tunneling loop with higher accuracy in comparison with a method of using a unique identifier. However, this method can encounter the reduced accuracy in a case in which the first tunnel entry point lies on a loop, increased memory and needed calculation.

Therefore, it is possible to make up for their short-coming by combining the above-mentioned two methods (method using a value unique to a tunnel entry point as an identifier and method of using a value unique to each tunnel packet as an identifier).

In this case, an identifier is composed of two portions of a static portion unique to each tunnel entry point and a different dynamic portion generated with respect to a different tunnel packet. As the static portion, it is possible to use an IP address of a tunnel entry point or an encrypted hash of an IP address of a tunnel entry point. On the other hand, as the dynamic portion, for example, it is possible to use a numeric value produced from a sequence of numbers generated at random or from a sequence of numbers in ascending order or descending order.

A person skilled in the art would recognize that an arbitrary combination of static and dynamic portions is available as an identifier. As the combination of static and dynamic portions, for example, a prefix of an identifier is used as a static portion while a suffix of the identifier is used as a dynamic portion, a prefix of an identifier is used as a dynamic while a suffix of the identifier is used as a static portion, or an identifier is formed by disposing the two portions alternately.

Figure 9:
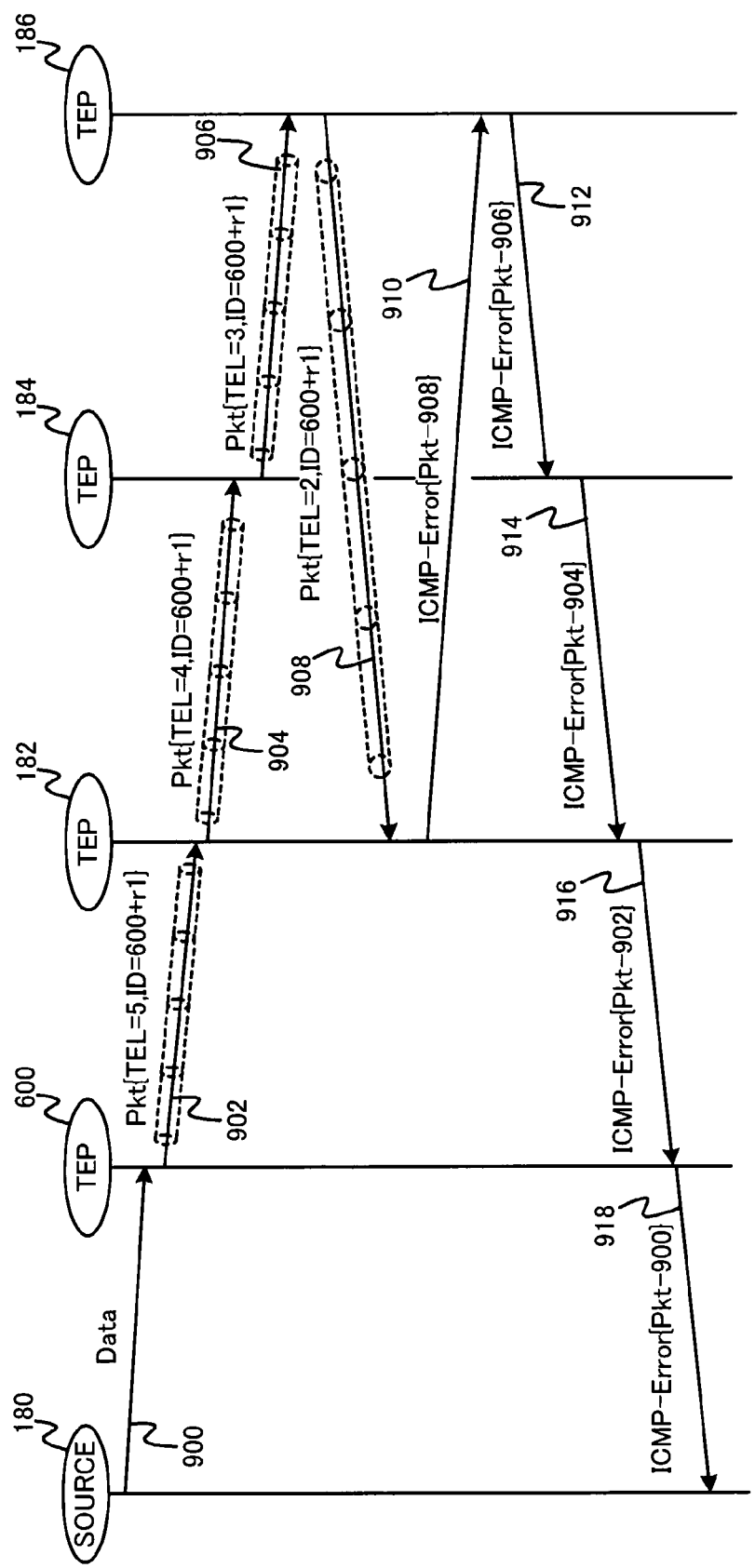
FIG. 9 is an illustration of one example of a sequence chart of an operation in a case in which a combination of static and dynamic identifiers is used in an embodiment of the present invention.

FIG. 9 shows a method of detecting a tunneling loop in a manner such that an identifier is composed of static and dynamic portions in an embodiment of the present invention. In FIG. 9, as well as FIG. 7, tunnel entry points (TEPs 600, 182, 184, 186) are disposed as shown in FIG. 6A. When the source node 180 transmits a data packet 900 (in FIG. 9, expressed as Data), the packet 900 reaches the first tunnel entry point (TEP 600).

TEP 600 encapsulates the packet 900 into a tunnel packet 902 having a new TEL option. The limit filed of the TEL option has a default value of, for example, "5" and an identifier value of, for example, "600+r1". The static portion of the identifier is "600" unique to TEP 600, and the dynamic portion produced by TEP 600 is "r1".

The tunnel packet 902 (in FIG. 7, expressed as Pkt {TEL=5, ID=600+r1}) reaches TEP 182. Since the identifier of TEP 182 itself and the identifier (identifier whereby the packet which was transferred in the past is identifiable) temporarily stored by TEP 182 do not exist in the identifier field of the TEL option in the tunnel packet 902, TEP 182 further encapsulates it into a tunnel packet 904. Since the original packet 902 contains a TEL option, TEP 182 simply copies the TEL option in the tunnel packet 902 to the tunnel packet 904 and decreases the value of the limit field to 4. Moreover, TEP 182 stores the identifier value "600+r1" for a given short time period.

In addition, the tunnel packet 904 (in FIG. 9, expressed as Pkt {TEL=4, ID=600+r1}) arrives at the next tunnel entry point (TEP 184). Since the identifier of TEP 184 itself and the identifier (identifier whereby the packet which was transferred in the past is identifiable) temporarily stored by TEP 184 do not exist in the identifier field of the TEL option in the tunnel packet 904, in TEP 184 the tunnel packet 904 is further encapsulated into the tunnel packet 906. Since the original packet 904 contains the TEL option, TEP 184 simply copies the TEL option in the tunnel packet 904 to the tunnel packet 906 and decreases the value of the limit field to 3. Moreover, likewise, TEP 184 also stores the identifier value "600+r1" for a given short time period.

Still additionally, the tunnel packet 906 (in FIG. 9, expressed as Pkt {TEL=3, ID=600+r1}) arrives at the next tunnel entry point (TEP 186). Since the identifier of TEP 186 itself and the identifier (identifier whereby the packet which was transferred in the past is identifiable) temporarily stored by TEP 186 do not exist in the identifier field of the TEL option in the tunnel packet 906, in TEP 186 the tunnel packet 906 is further encapsulated into the tunnel packet 908. Since the original packet 906 contains the TEL option, TEP 186 simply copies the TEL option in the tunnel packet 906 to the tunnel packet 908 and decreases the value of the limit field to 2. Moreover, likewise, TEP 186 also stores the identifier value "600+r1" for a given short time period.

Yet additionally, when the tunnel packet 908 (in FIG. 9, expressed as Pkt {TEL=2, ID=600+r1}) again arrives at TEP 182, TEP 182 makes a comparison between the identifier field of the tunnel packet 908 and the value of the identifier temporarily stored previously. TEP 182 notices the values of the identifiers are equal to each other, and this makes the fact of the detection of a tunneling loop obvious.

Incidentally, since a plurality of tunnel packets are handled in the actual environment, TEP can fix the storage quantity of identifiers temporarily stored and, whenever detecting new identifiers, successively store the detected new identifiers and successively delete the old identifiers.

The result is that TEP 182 transmits an ICMP error message 910 (in FIG. 9, expressed as ICMP-Error {Pkt-908}) to the transmitter (i.e., TEP 186) of the tunnel packet 908. The ICMP error message 910 contains the original tunnel packet 908 and indicates that the error signifies a "tunneling loop detected" type.

In addition, this error is propagated to the source node 180 in a reverse direction through ICMP error messages 912, 914, 916 and 918 (in FIG. 9, respectively expressed as ICMP-Error {Pkt-906}, ICMP-Error {Pkt-904}, ICMP-Error {Pkt-902} and ICMP-Error {Pkt-900}).

Figure 10:
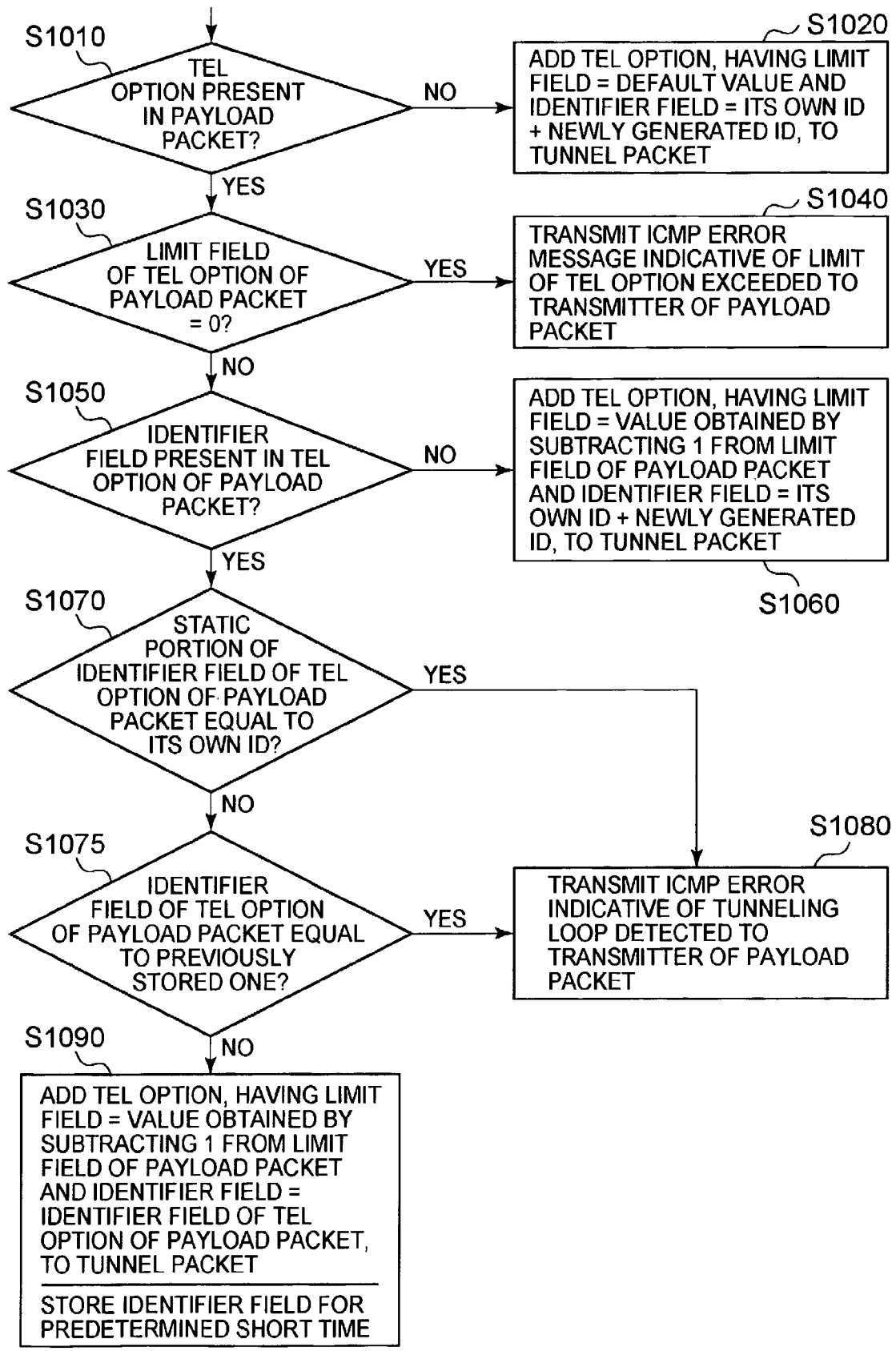
FIG. 10 is an illustration of a suitable flow chart of an algorithm to be used by a tunnel entry point for the processing on a packet in a case in which a combination of static and dynamic identifiers is used in an embodiment of the present invention.

In a case in which the static and dynamic portions exist in the identifier field of the TEL option, there is a need for the tunnel entry point to detect a tunneling loop according to an algorithm (for example, algorithm shown in FIG. 10) different from the above-mentioned algorithm. FIG. 10 shows an appropriate flow chart according to an embodiment of the present invention.

First of all, a step S1010 is implemented to check whether or not a TEL option exists in the destination option header of the payload.

If the step S1010 shows that the TEL option does not exist therein, a step S1020 follows, where the tunnel entry point encapsulates the payload packet and adds a TEL option to the destination option header of the tunnel packet. In this case, the TEL option added thereto contains a limit field in which set is a default value for the tunnel entry point and an identifier field in which set are an identifier unique to the tunnel entry point and a numeric value generated newly.

On the other hand, if the step S1010 shows that the TEL option exists in the payload packet, a step S1030 follows to make a check on the limit field of the TEL option of the payload packet. When the value of the limit field is zero, the operational flow advances to a step S1040 to return an ICMP error message to the source of the payload packet. This ICMP error message is set so as to indicate the fact that the limit of tunnel encapsulation has been exceeded.

If the value of the limit field is not zero, the operational flow proceeds to a step S1050 to check whether or not an identifier field is included in the TEL option of the payload packet.

If no identifier field is included in the TEL option of the payload packet, in a step S1060 the payload packet is encapsulated and a TEL option is added to the tunnel packet header. In this case, the TEL option to be added to the tunnel packet header contains a limit field having a value obtained by subtracting 1 from the value of the limit field of the TEL option in the payload packet and an identifier field in which set are an identifier unique to the tunnel entry point and a numeric value generated newly.

On the other hand, if the step S1050 shows that the TEL option exists in the identifier field of the TEL option of the payload packet, a step S1070 follows to check whether or not, with respect to the identifier field of the TEL option of the payload packet, the static portion is the same as the unit identifier (i.e., its own identifier) of the tunnel entry point.

If the step S1070 shows that the static portion is the same as the unique identifier of the tunnel entry point, the operational flow advances to a step S1080 because of the occurrence of a tunneling loop. In the step S1080, an ICMP error message to the effect of the detection of the tunneling loop is transmitted to the source of the payload packet.

If the step S1070 shows that the static portion is not the same as the unique identifier of the tunnel entry point, the operational flow advances to a step S1075 so as to check whether or not the entire identifier (static and dynamic portions) is the same as any one of the identifiers stored temporarily and related to the tunnel packets the tunnel entry point received previously. This step S1075 achieves the check on the identifiers produced by the same tunnel entry point.

If the step S1075 shows that the identifier field of the TEL option of the payload is the same as any one of the temporarily stored identifiers of the tunnel packets the tunnel entry point received previously, a tunneling loop is detected, thereby followed by a step S1080 to transmit an ICMP error message to the effect of the detection of the tunneling loop to the source of the payload packet.

On the other hand, if the step S1075 shows that the identifier field of the TEL option of the payload is not identical to any one of the temporarily stored identifiers of the tunnel packets the tunnel entry point received previously, a step S1090 follows to encapsulate the payload packet and add a TEL option to the tunnel packet header. In this case, the TEL option to be added to the tunnel packet header contains a limit field having a value obtained by subtracting 1 from the value of the limit field of the TEL option in the payload packet and an identifier field in which set is an identifier field of the TEL option of the payload packet. Moreover, this identifier field of the TEL option of the payload packet is stored by the tunnel entry point for a given short time period. When a time longer than the given short time period elapses, the identifier stored is released from the memory of the tunnel entry point.

Figure 11A:
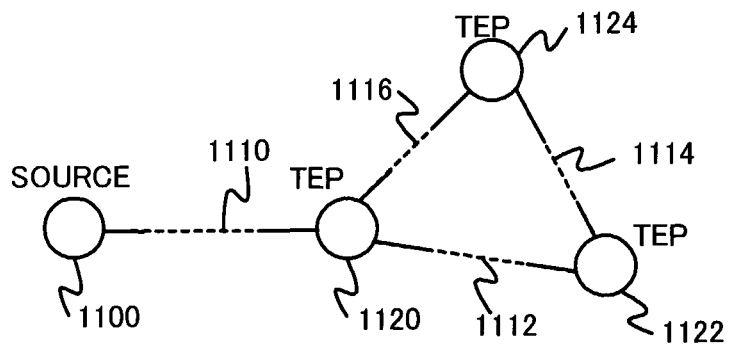
FIG. 11A is an illustration of a first example in the case of the formation of a tunneling loop in an embodiment of the present invention.
Figure 11B:
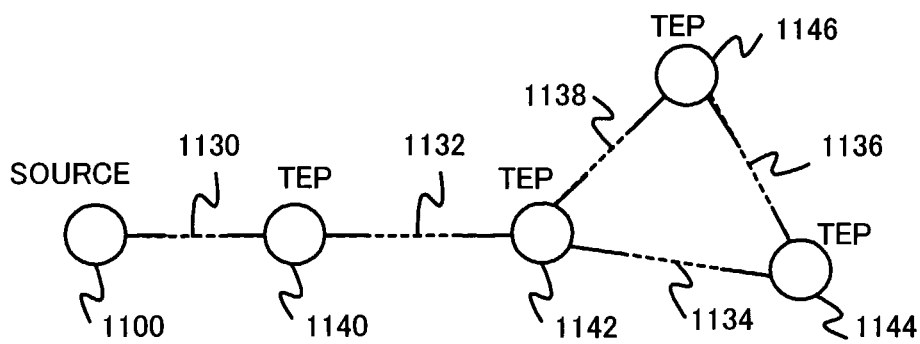
FIG. 11B is an illustration of a second example in the case of the formation of a tunneling loop in an embodiment of the present invention.

Among the cases of the formation of a tunneling loop, there are principally two cases. FIGS. 11A and 11B are illustrations of these two cases. In this case, a source node 1100 (in FIGS. 11A and 11B, expressed as source) is the source of a data packet.

In FIG. 11A, a data packet transmitted from the source node 1100 first goes through a path 1110 and then reaches an tunnel entry point (TEP 1120). Incidentally, although a plurality of routers not shown can lie along the path 1110, in this case, TEP 1120 serves as the first tunnel entry point for encapsulating the data packet.

In addition, the packet encapsulated is sent to TEP 1122 by way of a path 1112. TEP 1122 further encapsulates the tunnel packet. Likewise, a plurality of routers not shown can lie along the path 1112.

Still additionally, the packet encapsulated is sent to TEP 1124 by way of a path 1114 and the tunnel packet is further encapsulated in the TEP 1124. Incidentally, a plurality of routers not shown can lie along the path 1114.

Yet additionally, the packet encapsulated returns to TEP 1120 by way of a path 1116. Likewise, a plurality of routers not shown can reside along the path 1116. In consequence, a tunneling loop is established in a state where the first tunnel entry point (i.e., TEP 1120) serves as a part of the loop.

Meanwhile, in FIG. 11B, a data packet transmitted from the source node 1100 first reaches a tunnel entry point (TEP 1140) through a path 1130. Although a plurality of routers not shown can reside along the path 1130, in this case, TEP 1140 acts as the first tunnel entry point for encapsulating the data packet.

The packet encapsulated is sent through a path 1132 to TEP 1142, and the tunnel packet is further encapsulated in TEP 1142. Likewise, a plurality of routers not shown can reside along the path 1132.

Moreover, the packet encapsulated is sent through a path 1134 to TEP 1144, and the tunnel packet is further encapsulated in TEP 1144. Likewise, a plurality of routers not shown can reside along the path 1134.

Still moreover, the packet encapsulated is sent through a path 1136 to TEP 1146, and the tunnel packet is further encapsulated in TEP 1146. Likewise, a plurality of routers not shown can reside along the path 1136.

Yet moreover, the packet encapsulated returns through a path 1138 to TEP 1142. Likewise, a plurality of routers not shown can reside along the path 1138. In consequence, a tunneling loop is established in a state where the first tunnel entry point (i.e., TEP 1140) does not lie on the loop.

Figure 11C:
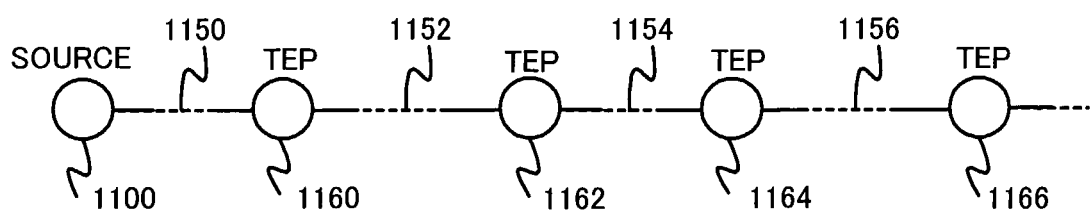
FIG. 11C is an illustration of one example in the case of no formation of a tunneling loop in an embodiment of the present invention.

FIG. 11C shows a different example of a configuration comprising a large number of tunnel entry points which do not form a tunneling loop. In FIG. 11C, a data packet transmitted from the source node 1100 (in FIG. 11C, expressed as Source) first goes through a path 1150 and reaches a tunnel entry point (TEP 1160). Although a plurality of routers not shown can reside along the path 1150, in this case, TEP 1160 acts as the first tunnel entry point for encapsulating the data packet.

In addition, the packet encapsulated is sent through a path 1152 to TEP 1162, and the tunnel packet is further encapsulated in TEP 1162. Likewise, a plurality of not shown routers can reside along the path 1152.

Following this, the packet encapsulated is sent through a path 1154 to TEP 1164, and the tunnel packet is further encapsulated in TEP 1164. Likewise, a plurality of routers not shown can reside along the path 1154.

Then, the packet encapsulated is sent through a path 1156 to TEP 1166, and the tunnel packet is further encapsulated in TEP 1166. Likewise, a plurality of routers not shown can reside along the path 1156. No tunneling loop is formed in this case. Incidentally, these tunnel entry points can be routers establishing tunnels with respect to other entities.

A person skilled in the art would appreciate that the present invention is applicable to any type of tunnel entry point, such as a VPN gateway, a Mobile IPv6 or Network Mobility home agent, a mobile router, or an IPv4-IPv6 transit router. Moreover, a tunneling loop could be established by a combination of different types of tunnel entry points.

This specification describes three preferred methods of using identifiers for detecting a tunneling loop. The respective types of identifiers provide different advantages, respectively. A person skilled in the art would appreciate that, in the present invention, the employment of different identifiers is feasible, particularly, according to different situations on the basis of the benefits of each form of identifier.

A first preferred tunneling loop detecting method according to the present invention uses a static and unique identifier such as an IP address of a tunnel entry point. As described above, the use of the static and unique identifier allows an tunnel entry point to detect all tunneling loops correctly when the first tunnel entry point forms a part of the loop (for example, the case of the configuration shown in FIG. 11A).

However, if the first tunnel entry point is not a part of the loop, through the use of the static identifier, difficulty is encountered in correctly distinguishing between a case in which a tunneling loop has occurred (for example, the case of the configuration shown in FIG. 11B) and a case in which, although no tunneling loop is present, the limit of tunnel encapsulation has been exceeded due to a large number of tunnel entry points (for example, the case of the configuration shown in FIG. 11C).

The employment of the static and unique identifier can provide an advantage in that the detection of the tunneling loop becomes feasible at all times in a case in which the first tunnel entry point constitutes a part of a tunneling loop, and further provide an advantage in that there is no need to store the identifier, the tunnel entry point received previously, for comparison.

Furthermore, a second preferred tunneling loop detecting method according to the present invention uses a different identifier, such as a numeric value produced by a random number generator or a serial numeric value, for each tunnel packet.

As described above, the employment of an identifier varying according to tunnel packet allows the tunnel entry point to detect a tunneling loop with higher accuracy in a case in which the first tunnel entry point does not constitute a part of the loop. However, the accuracy level depends upon the size of an identifier.

Still furthermore, a third preferred tunneling loop detecting method according to the present invention forms an identifier by combining a static and unique numeric value with a different numeric value produced for each tunnel packet.

As described above, the employment of this combination enables a tunnel entry point to correctly detect all tunneling loops in a case in which the first tunnel entry point lies on the loop (for example, the configuration shown in FIG. 11A), and permits the tunnel entry point to detect a tunneling loop with accuracy depending on the size of a variable portion of the identifier in a case in which the first tunnel entry point does not lie on the loop (for example, the configuration shown in FIG. 11B).

Although realizing the best result, this requires the maximum identifier size (accordingly, the packet overhead increases) and requires the temporary storage of the received identifiers for comparison in the tunnel entry point.

Figure 12:
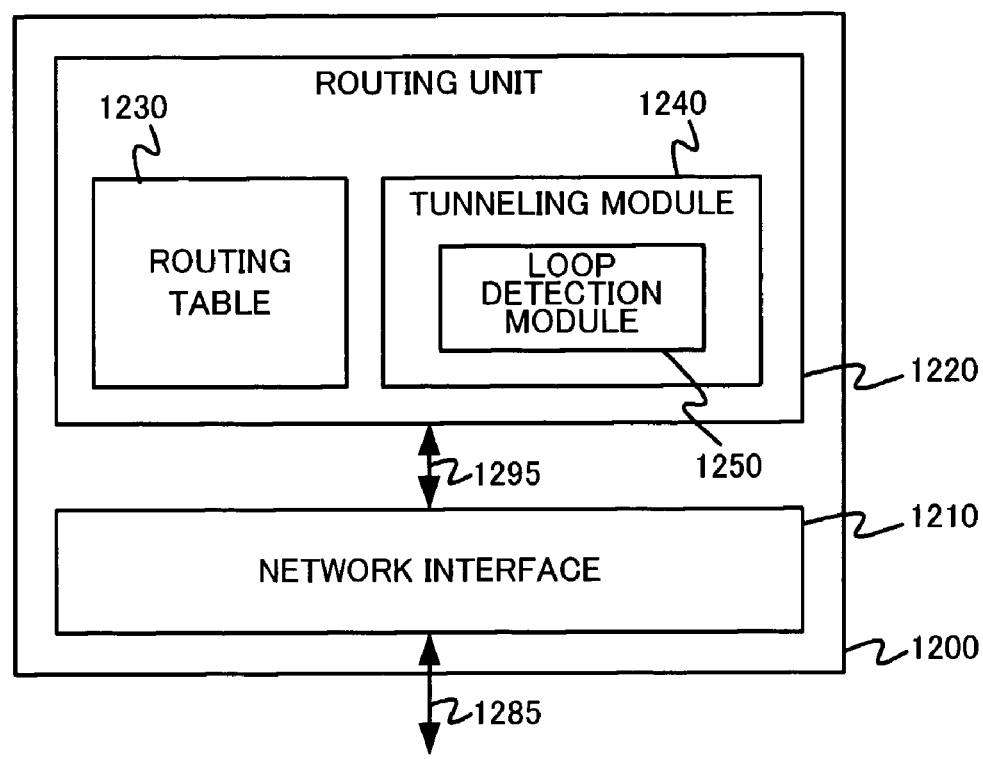
FIG. 12 is an illustration of an example of a configuration of a tunnel entry point according to an embodiment of the present invention.

In addition, for realizing the present invention, it is desirable to use a functional architecture shown in FIG. 12. FIG. 12 shows components related to a tunneling loop detection control function (tunneling loop detection control apparatus) contained in a tunnel entry point.

According to an embodiment of the present invention, a functional architecture of a tunnel entry point 1200 shown in FIG. 12 is made up of a routing unit 1220 and one or more network interfaces 1210. FIG. 12 illustrates only one network interface 1210.

Each network interface 1210 is a functional block representing all network hardware, software and protocols required for carrying out the tunnel entry point 1200's communication with other nodes through a path 1285 by means of a link access technology.

For example, for example, under the 7 layer model of OSI (Open System Interconnect) of ISO (International Standards Organization), the network interface 1210 contains a physical layer and a data link layer.

When the network interface 1210 receives a packet, for further processing, it hands over the packet through a data path 1295 to the routing unit 1220. Likewise, at the transmission of a packet, the routing unit 1220 hands over the packet to the network interface 1210 for making the transmission through the data path 1295.

Moreover, the routing unit 1220 conducts all processing for the routing under the internetworking layer. Under the OSI model, the routing unit 1220 encompasses all the functions in the network layer.

Basically, the routing unit 1220 carries out the IPv6 and general tunneling functions. The routing unit 1220 includes a routing table 1230 and a tunneling module 1240.

The routing table 1230 contains information to be used for the routing unit 1220 to determine a path. The routing table 1230 is structured as a list of entries and, preferably, each entry contains a destination field and a next hop field. The destination field stores a full destination address or a prefix of a destination address. In the next hop field, there is written a transferring location of a packet having a destination address agreeing with the value stored in the destination field.

Moreover, the tunneling module 1240 establishes, maintains and discards an IP tunnel as needed. For example, under NEMO Basic Support, a mobile router establishes a bidirectional tunnel with respect to its own home agent. This is maintained by the tunneling module 1240.

A person skilled in the art would recognize that it is preferable for the tunneling module 1240 to create a virtual network interface known as a tunnel interface. This tunnel interface would be seen from the routing unit 1220 as being equivalent to another network interface 1210.

Still moreover, the tunneling module 1240 contains a loop detection module 1250. The loop detection module 1250 inspects the received packet whether or not a tunnel encapsulation limit option exists and, in the case of the detection of a tunneling loop, triggers an error. In addition, the loop detection module 1250 also inserts a tunnel encapsulation limit option into a tunnel packet to be sent out and sets a limit value or identifier with respect to the tunnel encapsulation limit option. Still additionally, it is also acceptable that the loop detection module 1250 has a function for the readout or generation of a static identifier and/or a dynamic identifier, and that the loop detection module 1250 has a function for the generation of an identifier based on a combination of the static identifier and the dynamic identifier.

A person skilled in the art would recognize that the functional architecture of the tunnel entry point shown in FIG. 12 contains only minimal functional blocks needed for realizing a tunnel entry point and, actually, other functions may be needed. For example, in a case in which the tunnel entry point is a home agent, there is a need to add functions (for example, binding cache entry) for providing a home agent capability.

Although in the above-described embodiment an identifier is added at the tunneling of a packet transmitted through normal communication, even in a case in which an identifier according to the present invention is added to an arbitrary place of the header of the packet, the same operations and effects as those of the above-described embodiment are realizable. It is also appropriate that, for example, an identifier according to the present invention is inserted into a routing header of a packet at the transfer of the packet.

In addition, although in the above-described embodiment an identifier is added at the tunneling of a packet transmitted through normal communication, the detection of a tunneling loop is also feasible in a manner such that an identifier is added to an ICMP error message returned when the limit of tunnel encapsulation has been exceeded according to the same process as that of the above-described embodiment. That is, with this method, an identifier is added in a case in which an identifier is not added to an ICMP error message to be returned to the transmitter of the packet and, if an identifier is added to the ICMP error message, a comparison with an identifier whereby it is uniquely identifiable or an identifier it stored previously is made so that, if the comparison result shows no coincidence, the identifier added to the received ICMP error message is copied to an ICMP error message to be transmitted while, if the comparison result shows the coincidence, a tunneling loop is detected. In this connection, it is also acceptable that TEP, which has detected a tunneling loop, makes a change to an ICMP error message representative of the reason for exceeding the limit of tunnel encapsulation being because of the occurrence of a tunneling loop. Thus, the above-described method is designed to detect a tunneling loop only when there is an error.

Therefore, in accordance with the present invention, there is provided a tunneling loop detection control apparatus so arranged that a tunneling loop detection identifier is added to a packet, which is to be transferred, for allowing a detection as to whether or not there is a tunneling loop with respect to the packet, comprising:

packet receiving means for receiving the packet;

packet encapsulating means for encapsulating the packet received by the packet receiving means to generate a tunnel packet;

tunnel limit confirming means for, when the tunnel packet is generated by the packet encapsulating means, confirming a limit value defining an upper limit of tunnel encapsulation which exists in a header of the packet received by the packet receiving means;

identifier inserting means for, when the tunnel limit confirming means makes a decision that difficulty is encountered in carrying out further encapsulation with respect to the packet received by the packet receiving means, generating an error message notifying an overrun of an upper limit of tunnel encapsulation and inserting the tunneling loop detection identifier into a header of the error message; and error message returning means for returning the error message to a destination of notification of an error.

In addition, in accordance with the present invention, there is provided a tunneling loop detection control apparatus so arranged that a tunneling loop detection identifier is added to a packet, which is to be transferred, for allowing a detection as to whether or not there is a tunneling loop with respect to the packet, comprising:

packet receiving means for receiving said packet;

error message identifier comparing means for, when the packet received by the packet receiving means is an error message notifying an overrun of an upper limit of tunnel encapsulation, making a comparison as to whether or not a value of the tunneling loop detection identifier contained in the header of the error message is equal to a predetermined value;

error processing starting means for, when a result of the comparison by the error message identifier comparing means shows that the value of the tunneling loop detection identifier is equal to the predetermined value, starting detection error processing on a tunneling loop;

identifier inserting means for, when the result of the comparison by the error message identifier comparing means shows that the tunneling loop detection identifier is not equal to the predetermined value, inserting the tunneling loop detection identifier contained in the header of the error message received by the packet receiving means as the tunneling loop detection identifier into a header of an error message to be transmitted to a destination of notification of an error; and error message returning means for returning the error message, into which the tunneling loop detection identifier is inserted by the identifier inserting means, to the error notification destination.

Still additionally, in accordance with the present invention, there is provided a tunneling loop detection control apparatus so arranged that, in the above-mentioned tunneling loop detection control apparatus, unique information allocated to each equipment including the aforesaid tunneling loop detection control apparatus is used as the tunneling loop detection identifier.

Yet additionally, in accordance with the present invention, there is provided a tunneling loop detection control apparatus so arranged that, in the above-mentioned tunneling loop detection control apparatus, different information for each of the error messages is used as the tunneling loop detection identifier and comprising identifier storage control means for, when the result of the comparison by the identifier comparing means shows that the tunneling loop detection identifier is not equal to the predetermined value, executing control so that the tunneling loop detection identifier contained in the header of the error message received by the packet receiving means is stored as the predetermined value in predetermined information storing means.

Although this specification discloses and describes the present invention with the contents which are considered as being the most practical and preferred embodiments, a person skilled in the art would appreciate that various modifications can be made in details of design and parameters without departing from the scope and ambit of the present invention.

In this connection, although the aforesaid functional blocks used for the description of the embodiments of the present invention are typically realized as an LSI (Large Scale Integration) which is an integrated circuit, it is also appropriate that they are individually made in the form of one chip, or that they are made partially or wholly in the form of one chip. Although an LSI is taken in this case, it is equally referred to as an IC (Integrated Circuit), system LSI, super LSI or ultra LSI according to level of integration.

Moreover, the technique for the formation of an integrated circuit is not limited to LSI, but it is also acceptable to realize the formation of an integrated circuit by use of a dedicated circuit or general-purpose processor. Still moreover, it is also acceptable to use a FPGA (Field Programmable Gate Array) which allows programming after LSI manufacturing or reconfigurable processor which permits reconfiguring connections and setting of circuit cells in the interior of an LSI.

Still moreover, if a technique for the formation of an integrated circuit replaceable with the LSI appears owing to advance in semiconductor technology or a different technology derived therefrom, the functional blocks can naturally be integrated through the use of this technique. For example, a biotechnology or the like may be applicable.

INDUSTRIAL APPLICABILITY

The present invention provides an advantage in that an tunnel entry point can detect the presence of a tunneling loop, and it is applicable to communication fields related to packet-switched data communication networks, particularly to technical field of packet encapsulation (packet tunneling).

The invention claimed is:

1. A tunneling loop detection control apparatus so arranged that a tunneling loop detection identifier is added to a packet, which is to be transferred, for allowing a detection as to whether or not there is a tunneling loop with respect to said packet, said tunneling loop detection control apparatus comprising:
  a packet receiving unit for receiving said packet;
  a packet encapsulating unit for encapsulating said packet received by said packet receiving unit to generate a tunnel packet;
  an identifier inserting unit for, when said tunnel packet is generated by said packet encapsulating unit, inserting said tunneling loop detection identifier into a header of said tunnel packet;
  a tunnel packet transmitting unit for transmitting said tunnel packet generated by said packet encapsulating unit; and
  a loop detecting unit for confirming whether or not a same packet as said tunnel packet has already been received based on said tunneling loop detection identifier in a header of said packet received by said packet receiving unit, and starting detection error processing on the tunneling loop when the packet has already been received,
  wherein unique information allocated to each piece of communication including the tunneling loop detection control apparatus is used as said tunneling loop detection identifier, and
  wherein said loop detecting unit comprises:
    an identifier presence confirming unit for confirming whether or not said tunneling loop detection identifier is present in the header of said packet received by said packet receiving unit;
    an identifier insertion control unit for, when the presence of said tunneling loop detection identifier is not confirmed by said identifier presence confirming unit, controlling said identifier inserting unit so that said unique information is inserted as said tunneling loop detection identifier;
    an identifier comparing unit for, when the presence of said tunneling loop detection identifier is confirmed by said identifier presence confirming unit, confirming whether or not said tunneling loop detection identifier in the header of said packet received by said packet receiving unit is identical to said unique information;
    an error processing starting unit for, when a result of the comparison in said identifier comparing unit shows that said tunneling loop detection identifier in the header of said packet received by said packet receiving unit is identical to said unique information, starting said detection error processing on said tunneling loop; and
    an identifier duplication control unit for, when a result of the comparison in said identifier comparing unit shows that said tunneling loop detection identifier in the header of said packet received by said packet receiving unit is not identical to said unique information, controlling said identifier inserting unit so that said tunneling loop detection identifier included in the header of said packet received by said packet receiving unit is inserted as said tunneling loop detection identifier into the header of said tunnel packet.

2. A tunneling loop detection control a so arranged that a tunneling loop detection identifier is added to a packet, which is to be transferred, for allowing a detection as to whether or not there is a tunneling loop with respect to said packet, said tunneling loop detection control apparatus comprising:
  a packet receiving unit for receiving said packet;
  a packet encapsulating unit for encapsulating said packet received by said packet receiving unit to generate a tunnel packet
  an identifier inserting unit for, when said tunnel packet is generated by said packet encapsulating unit, inserting said tunneling loop detection identifier into a header of said tunnel packet
  a tunnel packet transmitting unit for transmitting said tunnel packet generated by said packet encapsulating unit; and
  a loop detecting unit for confirming whether or not a same packet as said tunnel packet has already been received based on said tunneling loop detection identifier in a header of said packet received by packet receiving unit, and starting detection error processing on the tunneling loop when the packet has already received,
  wherein unique information allocated to each piece of communication equipment including the tunneling loop detection control apparatus is used as said tunneling loop detection identifier, and
  wherein said loop detecting unit comprises:
    an error message identifier comparing unit for, when said packet received by said packet receiving unit is an error message indicating that an upper limit of tunnel encapsulation has been exceeded, making a comparison as to whether or not a value of said tunneling loop detection identifier included in a header of a packet existing in a payload section of said error message agrees with a tunneling loop detection identifier stored in a predetermined information storing unit;

an error processing starting unit for, when a result of the comparison in said error message identifier comparing unit shows that the value of said tunneling loop detection identifier included in the header of said packet existing in said payload section of said error message is identical to said tunneling loop detection identifier stored in said predetermined information storing unit, starting said detection error processing on said tunneling loop;

an error message processing control unit for, when the result of the comparison in said error message identifier comparing unit shows that the value of said tunneling loop detection identifier included in the header of said packet existing in said payload section of said error message is not identical to said tunneling loop detection identifier stored in said predetermined information storing unit, executing control so as to generate an error message including a packet corresponding to a packet existing in said payload section of said error message and included in a payload section of a packet existing in said payload section of said error message and further to store said tunneling loop detection identifier included in the header of said packet existing in said payload section of said error message in said predetermined information storing unit; and an error message returning unit for returning, to a destination of error notification, said error message generated by said error message generating unit.

3. A tunneling loop detection control apparatus so arranged that a tunneling loop detection identifier is added to a packet, which is to be transferred, for allowing a detection as to whether or not there is a tunneling loop with respect to said packet, said tunneling loop detection control apparatus comprising:

a packet receiving unit for receiving said packet;

a packet encapsulating unit for encapsulating said packet received by said packet receiving unit to generate a tunnel packet;

an identifier inserting unit for, when said tunnel packet is generated by said packet encapsulating unit, inserting said tunneling loop detection identifier into a header of said tunnel packet;

a tunnel packet transmitting unit for transmitting said tunnel packet generated by said packet encapsulating unit; and a loop detecting unit for confirming whether or not a same packet as said tunnel packet has already been received based on said tunneling loop detection identifier in a header of said packet received by said packet receiving unit, and starting detection error processing on the tunneling loop when the packet has already been received, wherein unique information allocated to each piece of communication equipment including the tunneling loop detection control apparatus is used as said tunneling loop detection identifier, and wherein said loop detecting unit comprises:

an identifier presence confirming unit for confirming whether or not said tunneling loop detection identifier is present in the header of said packet received by said packet receiving unit;

an identifier insertion control unit for, when the presence of said tunneling loop detection identifier is not confirmed by said identifier presence confirming unit, controlling said identifier inserting unit so that said unique information is inserted as said tunneling loop detection identifier;

an identifier comparing unit for, when the presence of said tunneling loop detection identifier is confirmed by said identifier presence confirming unit, confirming whether or not one piece of a plurality of pieces of information constituting said tunneling loop detection identifier in the header of said packet received by said packet receiving unit is identical to said unique information;

an error processing starting unit for, when a result of the comparison in said identifier comparing unit shows that said one piece of said plurality of pieces of information constituting said tunneling loop detection identifier in the header of said packet received by said packet receiving unit is identical to said unique information, starting said detection error processing on said tunneling loop; and an identifier insertion control unit for, when a result of the comparison in said identifier comparing unit shows that none of said plurality of pieces of information constituting said tunneling loop detection identifier in the header of said packet received by said packet receiving unit agrees with said unique information, controlling said identifier inserting unit so that another tunneling loop detection identifier is organized with said tunneling loop detection identifier included in the header of said packet received by said packet receiving unit and said unique information so as to insert the newly organized tunneling loop detection identifier as said tunneling loop detection identifier into the header of said tunnel packet.

4. A tunneling loop detection control apparatus so arranged that a tunneling loop detection identifier is added to a packet, which is to be transferred, for allowing a detection as to whether or not there is a tunneling loop with respect to said packet, said tunneling loop detection control apparatus comprising:

a packet receiving unit for receiving said packet;

a packet encapsulating unit for encapsulating said packet received by said packet receiving unit to generate a tunnel packet;

an identifier inserting unit for, when said tunnel packet is generated by said packet encapsulating unit, inserting said tunneling loop detection identifier into a header of said tunnel packet;

a tunnel packet transmitting unit for transmitting said tunnel packet generated by said packet encapsulating unit; and a loop detecting unit for confirming whether or not a same packet as said tunnel packet has already been received based on said tunneling loop detection identifier in a header of said packet received by said packet receiving unit, and starting detection error processing on the tunneling loop when the packet has already been received, wherein unique information allocated to each piece of communication equipment including the tunneling loop detection a control apparatus is used as said tunneling loop detection identifier, wherein different information for each of said tunnel packets generated by said packet encapsulating unit is used as said tunneling loop detection identifier, and wherein said loop detecting unit comprises:

an identifier presence confirming unit for confirming whether or not said tunneling loop detection identifier is present in the header of said packet received by said packet receiving unit;

an identifier insertion control unit for, when the presence of said tunneling loop detection identifier is not confirmed by said identifier presence confirming unit, controlling said identifier inserting unit so that said different information for each of said tunnel packets is inserted as said tunneling loop detection identifier;

an identifier comparing unit for, when the presence of said tunneling loop detection identifier is continued by said identifier presence confirming unit, confirming whether or not said tunneling loop detection identifier in the header of said packet received by said packet receiving unit agrees with a tunneling loop detection identifier stored in a predetermined information storing unit;

an error processing starting unit for, when a result of the comparison in said identifier comparing unit shows that said tunneling loop detection identifier in the header of said packet received by said packet receiving unit agrees with said tunneling loop detection identifier stored in said predetermined information storing unit, starting said detection error processing on said tunneling loop; and an identifier duplication control unit for, when a result of the comparison in said identifier comparing unit shows that said tunneling loop detection identifier in the header of said packet received by said packet receiving unit does not agree with said tunneling loop detection identifier stored in said predetermined information storing unit, controlling said identifier inserting unit so that said tunneling loop detection identifier included in the header of said packet received by said packet receiving unit is inserted as said tunneling loop detection identifier into the header of said tunnel packet and said tunneling loop detection identifier included in the header of said packet received by said packet receiving unit is stored in said predetermined information storing unit.

5. The tunneling loop detection control apparatus according to claim 4, further comprising a memory control unit for executing control so that, when a predetermined period of time elapses from the storage of said tunneling loop detection identifier, said tunneling loop detection identifier stored in said predetermined information storage unit is released from said predetermined information storage unit.

6. A tunneling loop detection control apparatus so arranged that a tunneling loop detection identifier is added to a packet, which is to be transferred, for allowing a detection as to whether or not there is a tunneling loop with respect to said packet, said tunneling loop detection control apparatus comprising:

a packet receiving unit for receiving said packet;

a packet encapsulating unit for encapsulating said packet received by said packet receiving unit to generate a tunnel packet;

an identifier inserting unit for, when said tunnel packet is generated by said packet encapsulating unit, inserting said tunneling loop detection identifier into a header of said tunnel packet;

a tunnel packet transmitting unit for transmitting said tunnel packet generated by said packet encapsulating unit; and a loop detecting unit for confirming whether or not a same packet as said tunnel packet has already been received based on said tunneling loop detection identifier in a header of said packet received by said packet receiving unit, and starting detection error processing on the tunneling loop when the packet has already been received, wherein unique information allocated to each piece of communication equipment including the tunneling loop detection control apparatus is used as said tunneling loop detection identifier, wherein information obtained by a combination of a static portion including unique information allocated to each of the pieces of communication equipment including the tunneling loop detection control apparatus and a dynamic portion including different information for each of said tunnel packets generated by said packet encapsulating unit is used as said tunneling loop detection identifier, and wherein said loop detecting unit comprises:

an identifier presence confirming unit for confirming whether or not said tunneling loop detection identifier is present in a header of said packet received by said packet receiving unit;

an identifier insertion control unit for, when the presence of said tunneling loop detection identifier is not confirmed by said identifier presence confirming unit, controlling said identifier inserting unit so that information obtained by a combination of said unique information and said different information for each of said tunnel packets is inserted as said tunneling loop detection identifier;

a static identifier comparing unit for, when the presence of said tunneling loop detection identifier is confirmed by said identifier presence confirming unit, confirming whether or not a static portion of said tunneling loop detection identifier in the header of said packet received by said packet receiving unit agrees with said unique information;

an identifier comparing unit for, when the presence of said tunneling loop detection identifier is confirmed by said identifier presence confirming unit, confirming whether or not said tunneling loop detection identifier in the header of said packet received by said packet receiving unit agrees with a tunneling loop detection identifier stored in a predetermined information storing unit;

an error processing starting unit for, when a result in one of said static identifier comparing unit and said identifier comparing unit shows the agreement therewith, starting said detection error processing on said tunneling loop; and an identifier duplication control unit for, when both the results in said static identifier comparing unit and said identifier comparing unit do not show the agreement, controlling said identifier inserting unit so that said tunneling loop detection identifier included in the header of said packet received by said packet receiving unit is inserted as said tunneling loop detection identifier into the header of said tunnel packet and said tunneling loop detection identifier included in the header of said packet received by said packet receiving unit is stored in said predetermined information storing unit.

7. The tunneling loop detection control apparatus according to claim 6, further comprising a memory control unit for executing control so that, when a predetermined period of time elapses from the storage of said tunneling loop detection identifier, said tunneling loop detection identifier stored in said predetermined information storage unit is released from said predetermined information storage unit.

* * * * *

UNITED STATES PATENT AND TRADEMARK OFFICE
CERTIFICATE OF CORRECTION

PATENT NO.       : 7,969,892 B2                                      Page 1 of 1
APPLICATION NO.  : 12/090972
DATED            : June 28, 2011
INVENTOR(S)      : Jun Hirano et al.

It is certified that error appears in the above-identified patent and that said Letters Patent is hereby corrected as shown below:

On the Title Page, Item (30), Foreign Application Priority Data, which should read:

"October 28, 2005 (JP).............2005-315489"

Signed and Sealed this
Twenty-eighth Day of February, 2012

David J. Kappos
*Director of the United States Patent and Trademark Office*